United States Patent
Graves

(10) Patent No.: US 9,599,199 B2
(45) Date of Patent: Mar. 21, 2017

(54) TENSIONER WITH MULTIPLE SPRING RATES

(71) Applicant: LITENS AUTOMOTIVE PARTNERSHIP, Woodbridge (CA)

(72) Inventor: Garreth Graves, Etobicoke (CA)

(73) Assignee: LITENS AUTOMOTIVE PARTNERSHIP, Woodbridge and ON (CA)

( * ) Notice: Subject to any disclaimer, the term of this patent is extended or adjusted under 35 U.S.C. 154(b) by 0 days.

(21) Appl. No.: 14/436,214

(22) PCT Filed: Nov. 25, 2013

(86) PCT No.: PCT/CA2013/000988
§ 371 (c)(1),
(2) Date: Apr. 16, 2015

(87) PCT Pub. No.: WO2014/078949
PCT Pub. Date: May 30, 2014

(65) Prior Publication Data
US 2015/0247559 A1     Sep. 3, 2015

Related U.S. Application Data

(60) Provisional application No. 61/729,492, filed on Nov. 23, 2012, provisional application No. 61/767,774, (Continued)

(51) Int. Cl.
*F16H 7/22* (2006.01)
*F16H 7/08* (2006.01)
(Continued)

(52) U.S. Cl.
CPC .......... *F16H 7/1281* (2013.01); *F02B 67/06* (2013.01); *F16F 1/121* (2013.01); *F16F 3/04* (2013.01);
(Continued)

(58) Field of Classification Search
CPC .......... F16H 7/1281; F16H 2007/0806; F16H 2007/0812; F16H 2007/0823; F16H 2007/0861
(Continued)

(56) References Cited

U.S. PATENT DOCUMENTS 4,300,890 A * 11/1981 Hallmann ............. F16H 7/1263
474/110
4,478,595 A * 10/1984 Hayakawa ............ F02B 77/081
474/109
(Continued)

FOREIGN PATENT DOCUMENTS

DE           19524403 A1    3/1997
DE      102011085595 A1    5/2013
(Continued)

OTHER PUBLICATIONS

"Kysor—On-Off Pneumatic Truck Cooling Fan Clutch", Jan. 1, 2006, BorgWarner.
(Continued)

*Primary Examiner* — Henry Liu
(74) *Attorney, Agent, or Firm* — Millman IP Inc.

(57) ABSTRACT

In a first aspect, a tensioner is provided which includes: an arm, including a pivot mount; a pulley rotatably mounted to the arm; and a strut pivotally connected to the arm. The strut includes: a base, having a pivot mount; a first body moveable relative to the base; a first resilient element connected between the base and the first body, the first resilient element having a first stiffness coefficient; a second body moveable relative to the first body, the second body having a pivot mount; a second resilient element connected between the first body and the second body, the second resilient element having a second stiffness coefficient that is lower than the first stiffness coefficient; and an actuator, connected to the
(Continued)

base and first body, for selectively moving the first body towards the base and compressing the first resilient element.

14 Claims, 39 Drawing Sheets

Related U.S. Application Data filed on Feb. 21, 2013, provisional application No. 61/895,799, filed on Oct. 25, 2013.

(51) Int. Cl.
| | |
|---|---|
| *F16H 7/12* | (2006.01) |
| *F02B 67/06* | (2006.01) |
| *F16F 15/067* | (2006.01) |
| *F16F 1/12* | (2006.01) |
| *F16F 3/04* | (2006.01) |

(52) U.S. Cl.
CPC ......... *F16F 15/067* (2013.01); *F16H 7/1218* (2013.01); *F16F 2228/08* (2013.01); *F16H 2007/0806* (2013.01); *F16H 2007/0812* (2013.01); *F16H 2007/0823* (2013.01); *F16H 2007/0865* (2013.01); *F16H 2007/0893* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,533,341 A * | 8/1985 | Yokota | .................. | F16H 7/0848 |
| | | | | 474/109 |
| 4,698,049 A | 10/1987 | Bytzek et al. | | |
| 5,733,214 A * | 3/1998 | Shiki | ......................... | F01L 1/02 |
| | | | | 474/110 |
| 6,165,091 A | 12/2000 | Dinca et al. | | |
| 6,953,407 B2 * | 10/2005 | Kitamura | ................ | F02B 67/06 |
| | | | | 474/109 |
| 7,081,059 B2 * | 7/2006 | Iwamoto | .................. | F01L 1/024 |
| | | | | 137/554 |
| 7,217,206 B2 * | 5/2007 | Stone | ...................... | F01L 1/024 |
| | | | | 474/110 |
| 7,275,462 B2 * | 10/2007 | Faus | ....................... | B25B 29/02 |
| | | | | 254/29 A |
| 7,699,732 B2 * | 4/2010 | Message | ............... | F16H 7/1281 |
| | | | | 474/106 |
| 8,845,487 B2 * | 9/2014 | Mueller | .................. | F02B 67/06 |
| | | | | 477/44 |
| 9,151,366 B2 * | 10/2015 | Antchak | ................ | B60K 25/02 |
| 2002/0052260 A1 * | 5/2002 | Kitamura | ................ | F02B 67/06 |
| | | | | 474/135 |
| 2003/0051956 A1 * | 3/2003 | Serkh | ........................ | F16F 7/08 |
| | | | | 188/322.14 |
| 2009/0241291 A1 * | 10/2009 | Smart | ................... | F16H 7/0831 |
| | | | | 16/342 |
| 2012/0010033 A1 * | 1/2012 | Schachtner | ......... | F16C 11/0619 |
| | | | | 474/110 |
| 2015/0024886 A1 * | 1/2015 | Chekansky | ............... | F16H 7/08 |
| | | | | 474/101 |
| 2015/0308545 A1 * | 10/2015 | Harvey | ................. | F16H 7/1218 |
| | | | | 474/117 |

FOREIGN PATENT DOCUMENTS

| | | |
|---|---|---|
| JP | 2751251 B2 | 5/1998 |
| JP | 2010-249273 A | 11/2010 |
| WO | 2006009973 A1 | 1/2006 |
| WO | 2007051507 A1 | 5/2007 |
| WO | 2012139224 A1 | 10/2012 |

OTHER PUBLICATIONS

"PU Solutions Elastogran—Cellasto A cellular polyurethane elastomer", Jul. 7, 2011, BASF Polyurethanes GmbH.
"Elastogran—Innovations in Cellasto", Jul. 1, 2011, BASF Polyurethanes GmbH.
"Horton DM Advantage On/Off Fan Drives", Jan. 1, 2012, Horton Holdings Inc.
International Search Report for PCT/CA2013/000988, Feb. 12, 2014, ISA.
Written Opinion for PCT/CA2013/000988, Feb. 14, 2014, ISA.
International Preliminary Report on Patentability for PCT/CA2013/000988, May 26, 2015, ISA.

* cited by examiner

PROPOSED APPLCATION

TENSIONER WITH MULTIPLE SPRING RATES

CROSS-REFERENCE TO RELATED APPLICATIONS

This application claims priority from U.S. Provisional Patent Application No. 61/729,492 filed Nov. 23, 2012, from U.S. Provisional Patent Application No. 61/767,774 filed Feb. 21, 2013, and from U.S. Provisional Patent Application No. 61/895,799, filed Oct. 25, 2013, the contents of all of which are incorporated herein in their entirety.

FIELD OF INVENTION

This disclosure relates generally to the field of automatic tensioners for endless drive elements such as chains or belts.

BACKGROUND OF INVENTION

Parasitic losses in a typical front engine accessory drive (FEAD) system of a vehicle can contribute to higher fuel consumption. The initial system belt tension is one of the main contributors to parasitic power losses. In heavy truck applications (for example, on highway class 8 trucks), it is often the power requirements of the engine fan that drive the required belt tension. (For example in large transport trucks, a typical large diameter belt driven cooling fan can absorb somewhere in the range of 50 to 75 horsepower directly from the engine crankshaft power output via the engine accessory belt drive, and can weigh in excess of 20 pounds for the clutch mechanism alone.) At the same time, the engine fan is not always needed to cool the engine. Consequently, many applications use a pneumatically controlled ON-OFF fan clutch. When the fan is not required to cool the engine, the clutch is controlled to decouple the fan from the engine accessory belt drive. However, when a typical passive tensioner is used to maintain belt tension in a typical FEAD system, the belt tension remains high even when the fan is off because of the relatively high spring rate used in the tensioner spring which is needed to prevent contact of the belt tensioner arm against its load stop when the fan is on. If the belt tension during these times can be reduced, the fuel consumption can also be reduced. FIGS. 1a and 1b show the tensioner torque requirements for a front engine accessory drive (FEAD) system in order to prevent slip in situations where the fan is off and the fan is on. The parasitic losses incurred during operation of the engine include belt losses which are directly related to the movement (e.g. flexing) of the belt itself, and friction losses which result from friction in the bearings supporting the shafts of the accessories and friction in the seals that are engaged with the accessory shafts. Additionally there are crankshaft losses. During vehicle use, the engine must overcome these losses (and other losses) and the remaining torque is the torque that is available for driving the vehicle. The higher the belt tension, the higher the parasitic losses.

SUMMARY

In a first aspect, a tensioner is provided for maintaining tension in an endless drive member. The tensioner includes an arm movably mountable to a stationary structure, a pulley rotatably mounted to the arm and which is engageable with the endless drive member and a strut pivotally connected to the arm. The strut includes a base that is mountable to the stationary structure, a first body moveable relative to the base, a first resilient element connected between the base and the first body, the first resilient element having a first stiffness coefficient, a second body moveable relative to the first body, the second body being connectable to the arm, a second resilient element connected between the first body and the second body, the second resilient element having a second stiffness coefficient that is different (preferably lower) than the first stiffness coefficient, and an actuator, positionable in a first state in which the actuator fixes the position of the first body relative to the base, and a second state in which the actuator permits movement of the first body relative to the base by the first resilient member.

The actuator may operate to collapse the first resilient element, in which case the stiffness coefficient of the strut is characterized by the stiffness coefficient of the second resilient element. The tensioner will thus provide a relatively lower tension in this condition. Alternatively, the actuator may not compress the first resilient element and the first resilient element may urge the first body towards the second body such that the second resilient element collapses, in which case the stiffness coefficient of the strut is characterized by the stiffness coefficient of the first resilient element. The tensioner will thus provide a relatively higher tension in this condition.

The tensioner may be mounted to an engine by either: (a) pivotally mounting the arm to the engine, pivotally mounting the base to the engine and pivotally mounting the second body to the arm; or (b) pivotally mounting the arm to the engine, pivotally mounting the second body to the engine and pivotally mounting the base to the arm.

In one embodiment the foregoing tensioner resembles a spring-strut tensioner, where a linear spring pushes against an arm to provide tension on a belt. However, this embodiment utilizes two or more springs. A first spring is a relatively stiffer, higher rate spring that is used to provide high tension for when the fan is engaged, and a second spring is a relatively softer, lower rate spring that is used to provide low tension for when the fan is disengaged. A pneumatic cylinder can be deployed to collapse the stiffer high rate spring to a solid state, engaging only the softer, low rate spring (providing a low tension). When the pneumatic cylinder is retracted (when compressed air is not present), the stiffer high rate spring becomes active. The force from the stiffer high rate spring is enough to collapse the softer low rate spring, and only the stiffer high rate spring reacts against the belt to provide a high tension.

The first and second springs may be arranged to act in series on the tensioner arm. Alternatively, the first and second springs may be arranged to act in parallel on the tensioner arm. In some embodiments, the first and second springs act in parallel and a third spring is provided that acts in series with one of the first and second springs. In still other embodiments, further springs are provided, one or more of which may act in series with one or more of the first and second springs, and one or more of which may act in parallel with the first and second springs.

In another aspect, a tensioner is provided for maintaining tension in an endless drive member, wherein the tensioner includes an arm movably mountable to a stationary structure, a pulley rotatably mounted to the arm, and a strut pivotally connected to the arm. The strut includes a base, the base configured for mounting to the stationary structure, a first resilient element that is engaged with the base, and operatively connectable to the arm, the first resilient element having a first stiffness coefficient; a second resilient element operatively connected to the arm, the second resilient element having a second stiffness coefficient, and an actuator that is movable between a first state and a second state, wherein in the first state the actuator operatively disengages the first resilient member from the arm leaving only the second resilient member engaged with the arm, and in the second state the actuator permits operative engagement of the first resilient member to the arm separately from and in addition to the first resilient member being operatively engaged with the arm.

Optionally, the actuator is a first actuator and the tensioner further comprises: a third resilient member that is operatively connectable to the arm and having a third stiffness coefficient; and a second actuator that is movable between a first position and a second position wherein in the first position the second actuator operatively disengages the third resilient member from the arm, and in the second position the second actuator permits operative engagement the third resilient member to the arm.

Further optionally, the tensioner is operable in a low tension mode in which the first and second actuators are in the first positions, a medium tension mode in which the first actuator is in the first position and the second actuator is in the second position, and a high tension mode in which both the first and second actuators are in the second positions.

Optionally, the tensioner further includes a damping member that is positioned to engage a friction surface during movement of the arm to dampen movement of the arm.

Optionally, the arm has an arm pivot connector for mounting the arm to the stationary structure, and the second body is pivotally connected to the arm, and the base has a base pivot connector configured for pivotally mounting the base to the stationary structure.

While a pressurized (i.e. positive pressure) pneumatic actuator can be used, in other embodiments the actuator may be a negative pressure (vacuum) actuator, a hydraulic actuator, an electric motor (and optional gear arrangement), a linear or rotary solenoid, a wax actuator, a shape memory allow actuator, a bi-metallic actuator, or any other suitable actuator. Furthermore, in some embodiments, a plurality of actuators may be used to control the use of a plurality of springs. In such cases it will be noted that all the actuators need not be identical. For example, an electric motor may be used for one actuator while a solenoid may be used for another.

BRIEF DESCRIPTION OF THE DRAWINGS

The foregoing and other aspects of the disclosure will be more readily appreciated by reference to the accompanying drawings, wherein.

DETAILED DESCRIPTION OF ILLUSTRATED EMBODIMENTS

Figure 1A:
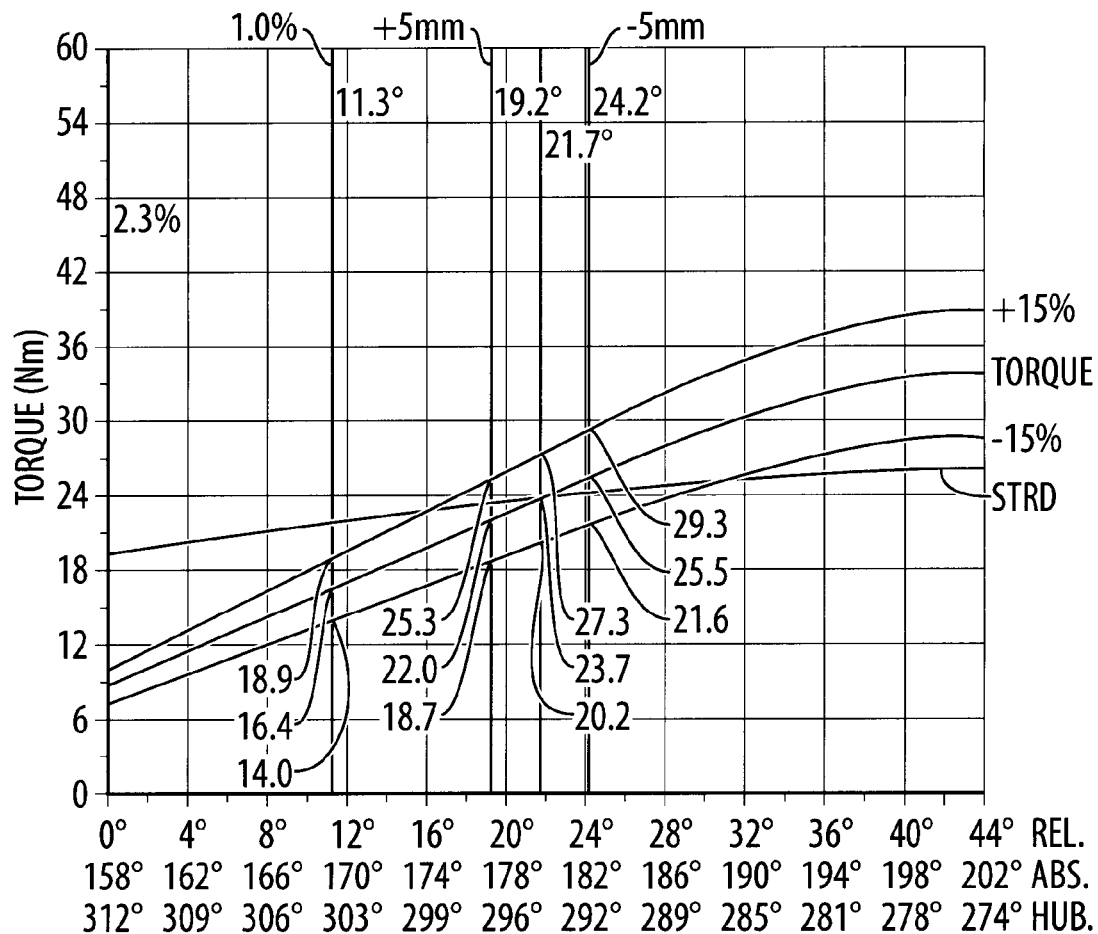
FIGS. 1a and 1b are graphs that show tensioner torque requirements for a tensioner in a FEAD system for a vehicle engine.
Figure 1B:
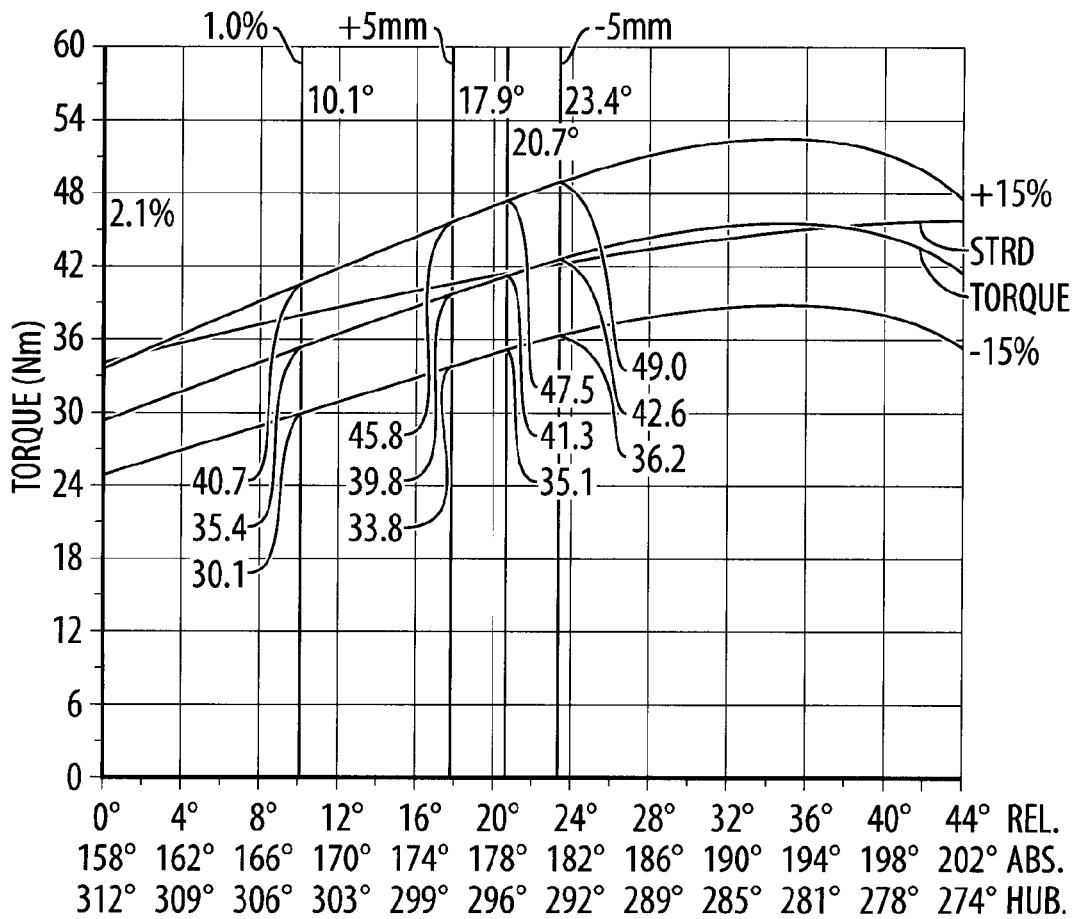
Figure 2:
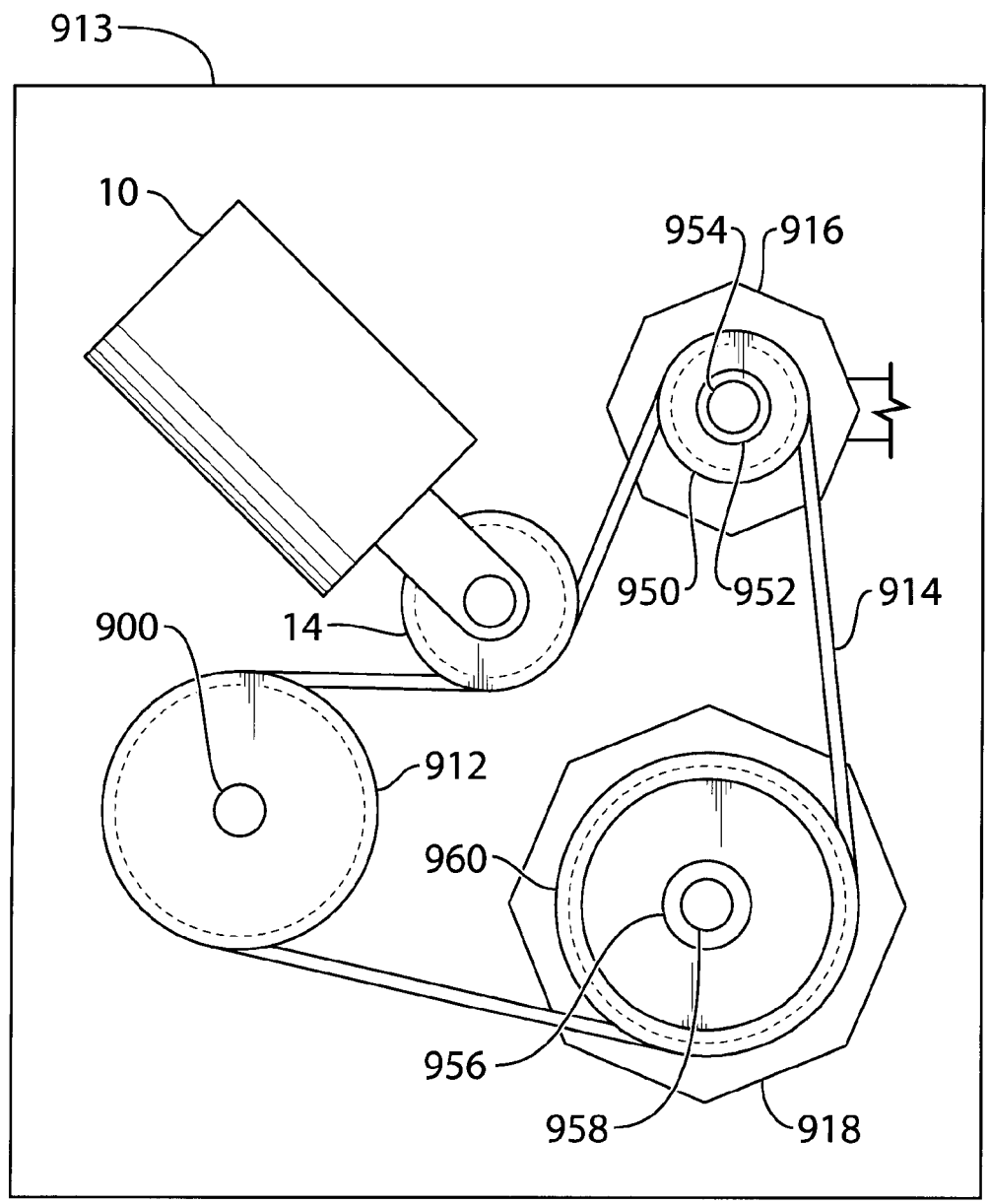
FIG. 2 is an elevation view of an engine incorporating a tensioner in accordance with an embodiment of the present invention.

Reference is made to FIG. 2, which shows a crankshaft 910 from an engine 913 from a vehicle (not shown). It will be noted that the engine 913 is shown as a simple rectangle for illustrative purposes. It will be understood that the engine 913 may have any suitable shape. The vehicle may be any suitable vehicle, such as an automobile, a truck, a van, a minivan, a bus, an SUV, a military vehicle, a boat or any other suitable vehicle.

The crankshaft 910 has a crankshaft pulley 912 thereon. The crankshaft pulley 912 drives one or more vehicle accessories via a belt 914. The term 'belt' is used herein for convenience, however for the purpose of the claims and for the scope of this disclosure it will be understood that the belt 914 may alternatively be any other type of suitable endless drive member. It will further be noted that, in cases where the endless drive member is a belt, it may be any suitable type of belt, such as a flat belt, a V belt, a poly-V belt, a timing belt, or any other suitable type of belt. The term 'pulley' is similarly used for convenience and any other suitable rotary drive member may be used instead, such as a sprocket.

The accessories may include, for example, an alternator 916, an air conditioning compressor 918, a water pump (not shown), a power steering pump (not shown) and/or any other suitable accessories. Each of the driven accessories has a shaft, and a pulley that is connectable and disconnectable from the shaft via a clutch. The alternator shaft, clutch and pulley are shown at 954, 952 and 950 respectively. The air conditioning compressor shaft, clutch and pulley are shown at 956, 958 and 960 respectively. This permits each of the accessories to be disconnected when not needed even though the belt 914 itself is still being driven by the crankshaft 910.

Providing tension in the belt 914 is beneficial in that it reduces the amount of slip that can occur between the belt 914 and the driven accessories or even between the belt 914 and the crankshaft 910. However, providing an unnecessarily high tension in the belt 914 has many detrimental effects. For example, it causes more power from the engine 913 to be consumed in driving the accessories, leaving less power for use in driving the vehicle. As a result, to achieve a particular level of performance from the vehicle, a greater amount of fuel would be consumed than would be consumed than would be needed if the power loss were smaller. Additionally, a high belt tension generates greater hub loads on the pulleys for the driven accessories, which necessitates the use of relatively larger shafts on the accessories, larger bearings to support the shafts, heavier brackets to hold the accessories in place, all of which add to the weight of the vehicle and thereby negatively impact fuel economy for the vehicle.

Having an unnecessarily high belt tension is also detrimental in other systems where a motive means drives at least one other device via a belt. The motive means need not be an internal combustion engine—it could be any other suitable type of motive means such as, for example, an electric motor. Furthermore, the motive means need not be used in a vehicular environment. For example the motive means could be a stationary engine that is used to drive a generator and optionally other devices via a belt. More specifically, the present disclosure is applicable to any system in which a motive means drives an endless drive member which in turn drives one or more other devices, wherein under certain conditions a high tension is needed in the endless drive member to prevent slip and under other conditions a lower tension is sufficient in the endless drive member to prevent slip.

A tensioner 10 provides multiple spring rates for use in providing a high belt tension sometimes and a low belt tension sometimes. The tensioner 10 is represented as a rectangular shape with a pulley 14, however this is for illustrative purposes only, and the shape of the tensioner 10 may be as shown in any of the embodiments shown in FIG. 3A onwards.

Figure 3A:
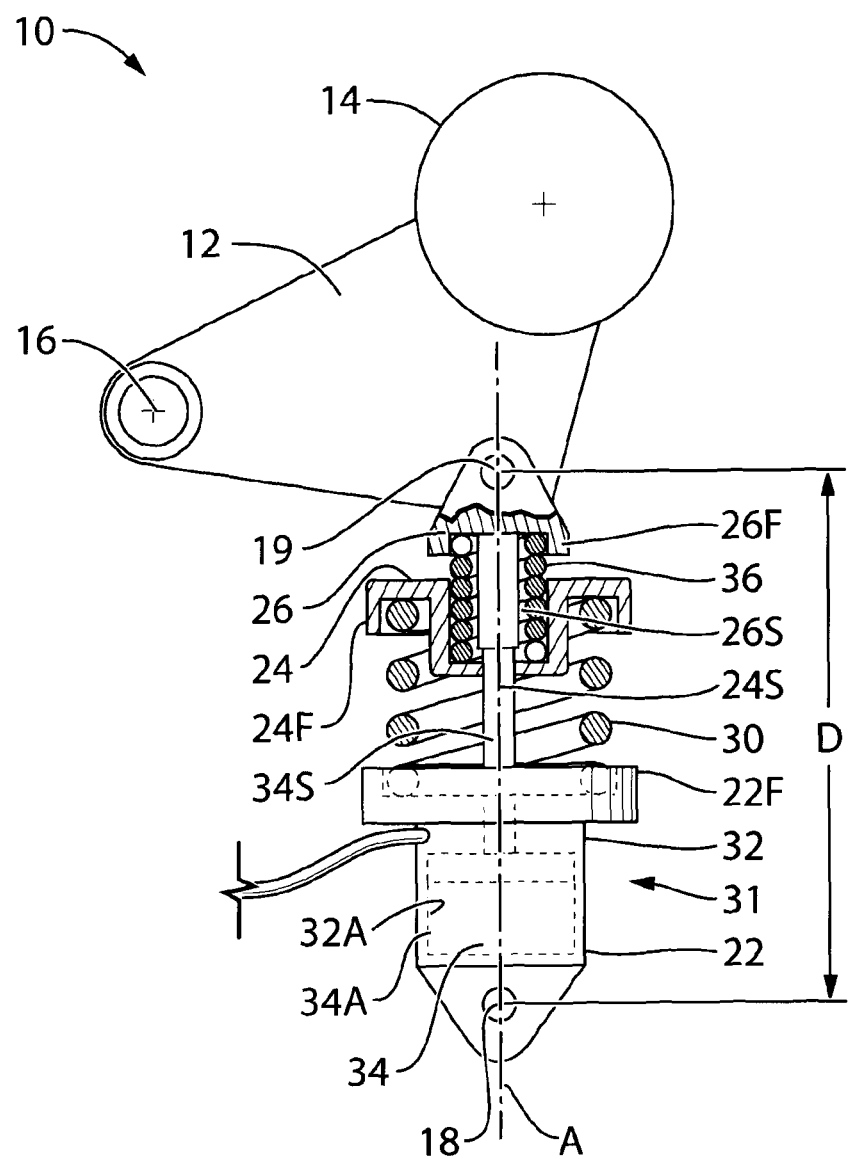
FIGS. 3A and 3B are elevation views of an embodiment of the tensioner shown in FIG. 2 in low tension and high tension modes respectively.
Figure 3B:
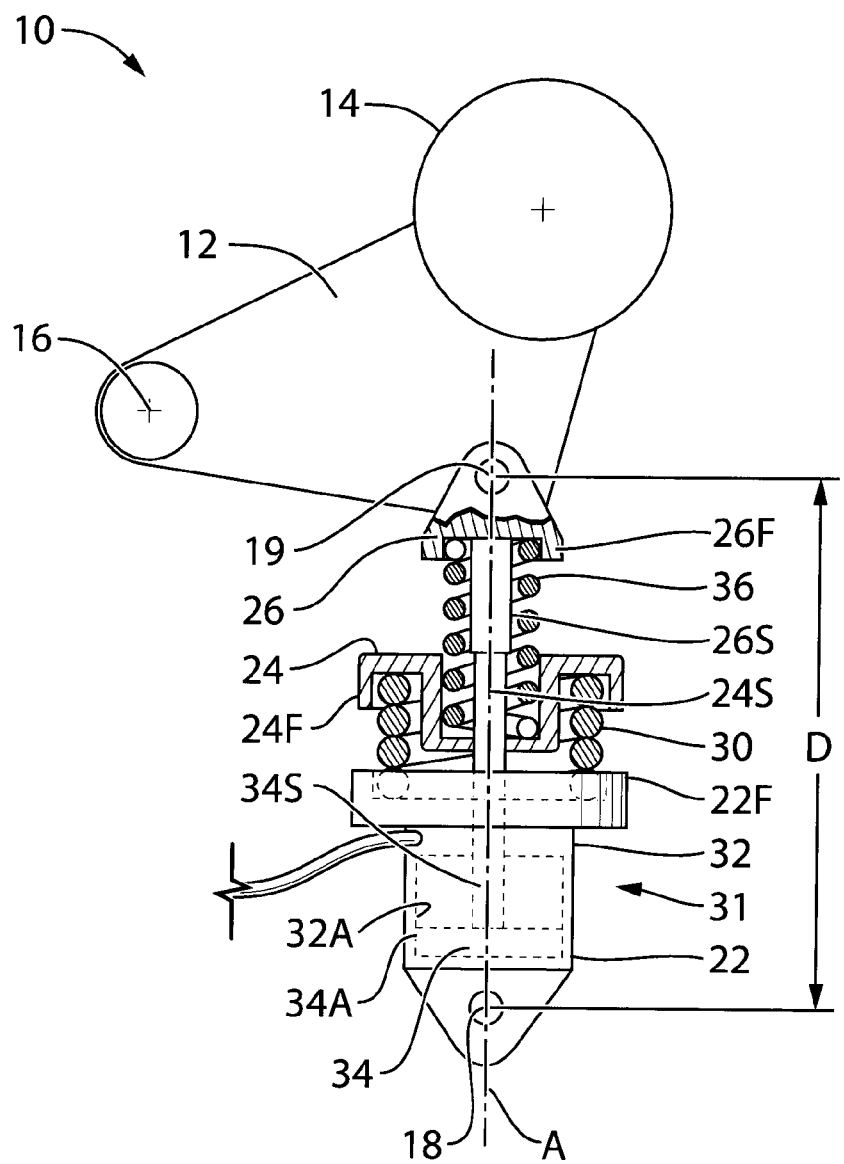

FIGS. 3A and 3B show one embodiment of the tensioner 10 that provides multiple spring rates. The tensioner includes: an arm 12; the pulley 14 pivotally mounted to the arm 12, for receiving power from an endless drive element such as the belt 914 (FIG. 2); and a pivot connector 16 (such as an aperture for receiving a shoulder fastener) for pivotally mounting the arm 12 to a stationary structure such as a first region on the frame or block of the engine 913. For greater clarity, the stationary structure is the entirety of all suitable structural portions of the vehicle (or of the tensioner's environment in the case of a non-vehicular application) that is considered stationary for the purposes of mounting portions of the tensioner 10. In a vehicular application, this would correspond to the frame of the vehicle, the engine block and support frame, the vehicle body and any non-moving structural elements and components. Where the pivot connector 16 is an aperture, the arm 12 may have a bushing in the aperture to frictionally engage the shoulder fastener (to engage a friction surface that is the outer surface of the shoulder fastener), which provides some degree of damping as the arm 12 pivots about the pivot connector 16.

A strut 20 has a base 22 that is pivotally mounted to the stationary structure (e.g. at a second region on the frame or block of the engine 913) via a base pivot connector 18 which may be an aperture that receives a shoulder fastener. The strut 20 is pivotally mounted at an opposite end thereof to the arm 12 via a second pivot connector 19 which may be an aperture that aligns with an aperture on the arm 12 so that both apertures receive a pin or rivet therethrough. The strut 20 has an axis A. The strut 20 further includes a first body 24 that can move relative to the base 22, and a second body 26 that can move relative to the first body 24. The first body 24 may be movable in any suitable way relative to the base 22, such as, for example, linearly as shown in FIGS. 3A and 3B, or alternatively along an arcuate (e.g. circular) path. The second body 24 may be movable in any suitable way relative to the first body 24, such as, for example, linearly as shown in FIGS. 3A and 3B, or alternatively along an arcuate (e.g. circular) path.

A first resilient element 30 is connected between the base 22 and the first body 24. The base 22 and first moveable body 24 include circumferential flanges 22F and 24F, respectively, for retaining a first resilient element 30 therebetween. The first resilient element 30 may be any suitable type of resilient element such as for example a helical coil compression spring. For convenience the first resilient element may be referred to in this disclosure as a first spring 30, however it will be understood that any other suitable type of resilient element 30 may alternatively be used. The first spring 30 has a high stiffness coefficient (spring rate) and may be referred to as the 'high rate' spring 30 or the 'high tension' spring 30.

A second resilient element 36 is connected between the first body 24 and the second body 26. Inboard of the circumferential flange 24C, the first moveable body 24 includes a cup structure 24C and the second moveable body 26 includes a circumferential flange 26F for retaining the second spring 30 between the first and second moveable bodies 24 and 26. The second resilient element 36 may be any suitable type of resilient element such as for example a helical coil compression spring. For convenience the second resilient element 36 may be referred to in this disclosure as a second spring 36, however it will be understood that any other suitable type of resilient element may alternatively be used. The second spring 36 has a comparatively low stiffness coefficient relative to the high rate spring 30 and may be referred to as the 'low rate' spring 36 or the 'low tension' spring 36.

The first moveable body 24 may include a fixed stem 24S and the second telescopic body 26 may include a fixed sleeve 26S (or vice versa) (shown in stippled lines) that fits over the stem 24S. The two components 24S, 26S can axially slide relative to one another and collectively present a telescoping shaft about which the low rate spring 36 is disposed to thereby prevent it from buckling.

The base 22 has an actuator 31 mounted thereto which may be, for example, a pneumatic actuator including a cylinder 32 and piston 34. The piston 34 has a rod 34S that is fixed at a free end to the first moveable body 24.

The actuator 31 is positionable in a first state in which it fixes the position of the first body 24 relative to the base 22, and a second state in which it permits movement of the first body 24 relative to the base 22 by the first spring 30.

Figure 4A:
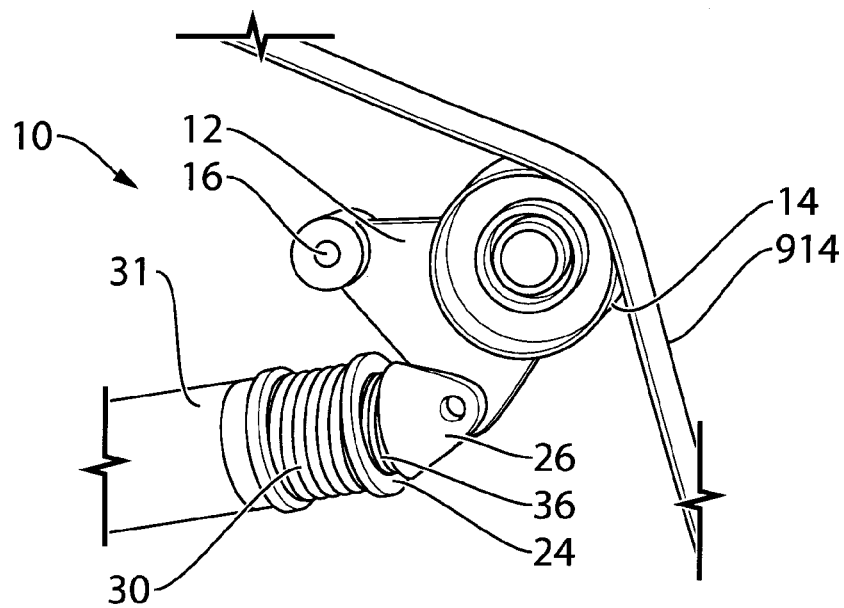
FIGS. 4A and 4B are perspective views of a portion of the tensioner shown in FIGS. 3A and 3B in the low and high tension modes.

FIGS. 3A and 4A illustrate the condition of the tensioner 10 when the pneumatic actuator 31 is in the second state (wherein it is inactive, i.e. when there is no compressed air in the cylinder 32), which may be considered to be a high tension mode. In this case, given a selected distance D between first and second pivot connectors 18, 19, the high rate spring 30 generates a high force, un-resisted by the piston 34, which urges the first moveable body 24 towards the second moveable body 26 and in the process compresses and collapses the low rate spring 36. Preferably the low rate spring 36 is deformed sufficiently (i.e. fully collapsed the coils of the spring 36 are in contact with one another) such that it is solid (i.e. since no further compression of the spring 36 is possible). In this position the second moveable body 26 is fixed in position relative to the first moveable body 24 and the low rate spring 36 becomes inoperative in terms of resiliently reacting to pivotal movement of the arm 12. Instead, as the piston 34 freely floats within the cylinder 32, only the high rate spring 30 is operative to resiliently react to pivotal movement of the arm 12. In this position the high rate spring 36 pushes the pulley 14 with a relatively large degree of force to provide a relatively high tension against the belt 914 (FIG. 2). When the actuator 31 is inactive, if the low rate spring 36 is collapsed fully the spring rate of the strut 20 is the spring rate of the first spring 30.

Figure 4B:
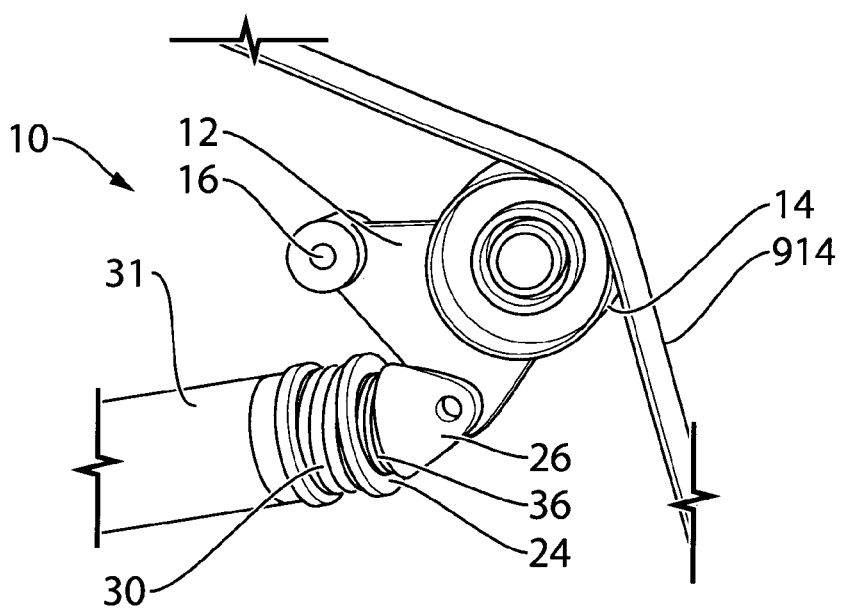

FIGS. 3B and 4B illustrate the condition of the tensioner 10 when the pneumatic actuator is in the first state (wherein it is active, i.e. when there is considerable compressed air in the cylinder 32), which may be considered to be a low tension mode. In this case, given a selected distance D between first and second pivot connectors 18, 19, the piston 34 and interconnected first moveable body 24 are urged toward the first connector 18, and in the process they compress and fully collapse the high rate spring 30 such that the first spring 30 is solid (i.e. the coils of the first spring 30 are in contact with one another). In this position the first moveable body 24 is essentially locked against the base 22 and the high rate spring 30 becomes inoperative in terms of resiliently reacting to pivotal movement of the arm 12. Instead, the low rate spring 36 becomes decompressed and operative to resiliently react to pivotal movement of the arm 12. In this position the low rate spring 30 pushes the pulley 14 with a relatively low degree of force to provide a relatively low tension against the belt 914. When this occurs the spring rate of the strut 20 is the spring rate of the second spring 36.

FIGS. 3B and 4B correspond to a first state for the actuator 31 and FIGS. 3A and 4A correspond to a second state for the actuator 31. Thus the actuator is positionable in a first state in which the actuator 31 fixes the position of the first body 24 relative to the base 22, and a second state in which the actuator 31 permits movement of the first body 24 relative to the base 22 by the first spring 30.

The sizes and characteristics of the high and low rate springs 30, 36 may be selected to fully compress the low rate spring 36 in the high tension mode when the distance D is at a nominal maximum, which corresponds to a nominally minimum hub load provided by the belt 914 against the pulley when the engine fan is operative. Likewise, the sizes and characteristics of the high and low rate springs 30 and 36 may also be selected to fully compress the high rate spring 30 in the low tension mode when the distance D is at a nominal maximum, which corresponds to a nominally minimum hub load provided by the belt against the pulley 14 when the engine fan 918 is inoperative.

Those skilled in the art may also appreciate that the pneumatic actuator may also be controlled so that in the high or low tension modes the low or high rate springs 36, 30 are both partially collapsed. In such cases the effective spring rate is a combination of the two spring rates of the individual springs 36 and 30, until the low rate spring 36 collapses following which only the high rate spring 30 is operative. For example, where the two springs 36 and 30 are in series, as shown in FIGS. 3A and 3B the effective rate is the reciprocal of the sum of the reciprocals of the two spring rates.

Advantageously, the tensioner 10 defaults to the high tension mode in that, in the event the pneumatic actuator fails, the tensioner automatically operates in the high tension mode. This may increase fuel consumption, but prevents the more serious problem of the engine fan 918 potentially not working which could cause engine overheating.

In the high tension mode, the tensioner 10 may be additionally damped via mutually engaging friction surfaces shown at 34A and 32A between the piston 34 and cylinder 32. In the low tension mode additional damping may be provided by friction between the inner diameter of the low rate spring 36 and the telescoping shaft which may be formed from a suitable material for this purpose.

Figure 5:
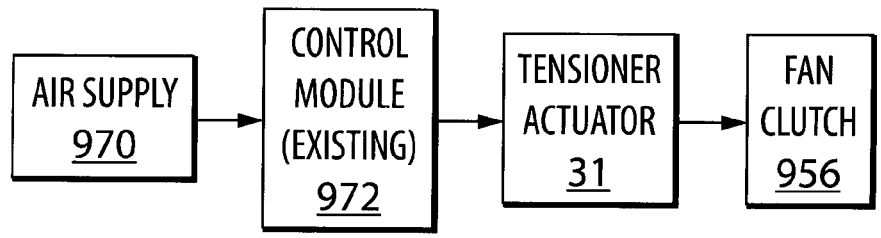
FIG. 5 is a block diagram illustrating the tensioner tapped in to a compressed air system of a vehicle.
Figure 6:
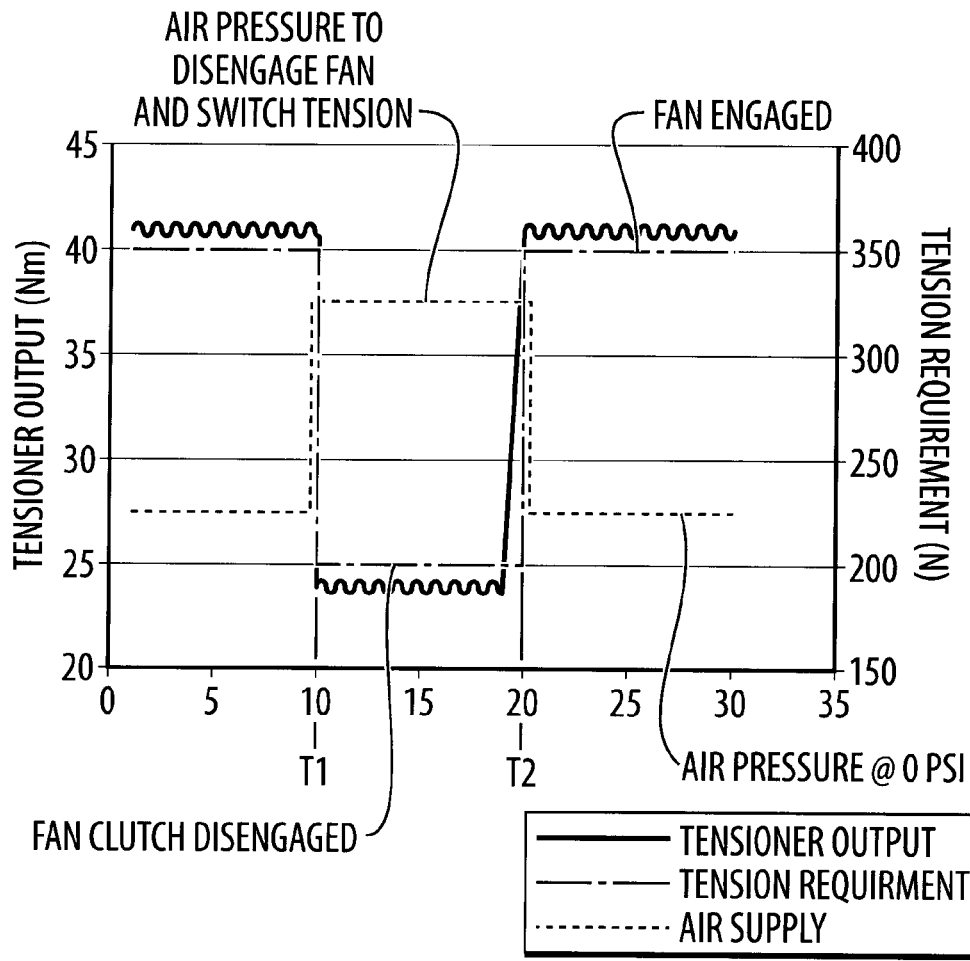
FIG. 6 is a graph illustrating control of the tensioner over a period of time.

Referring to FIG. 5, in a pneumatic or hydraulic ON-OFF cooling fan clutch system 956, the pneumatic actuator of the tensioner 10 can be controlled in conjunction therewith as it is possible to tap into the air supply system (shown at 970 in FIG. 5) of the vehicle. With such pneumatic clutch systems, a large pneumatic cylinder, located inside of the fan driver itself, is used to either engage or disengage the cooling fan from the belt drive in a digital ON-OFF state, in response to a control signal from the engine cooling management system, shown at 972. For example, referring to FIG. 6, the engine cooling management system 972 may turn ON the fan pneumatic clutch 956 when the engine cooling management system 972 senses engine coolant temperature above a threshold. At this time, the engine cooling management system 972 may also control the pneumatic actuator to place the tensioner 10 in the high tension mode. At time T1, the engine cooling management system may turn OFF the fan pneumatic clutch 956 when the system 972 senses engine coolant temperature below a threshold. At this time, the engine cooling management system 972 may also control the pneumatic actuator 31 to place the tensioner 10 in the low tension mode. As shown in FIG. 5, compressed air may be sent from the air supply 970 to the actuator 31 and to the fan clutch 918. At time T2, the system 972 may again turn ON the fan clutch 956 and may again place the tensioner in the high tension mode by depressurizing the cylinder 32 (i.e. opening the cylinder 32 to atmosphere).

Figure 7:
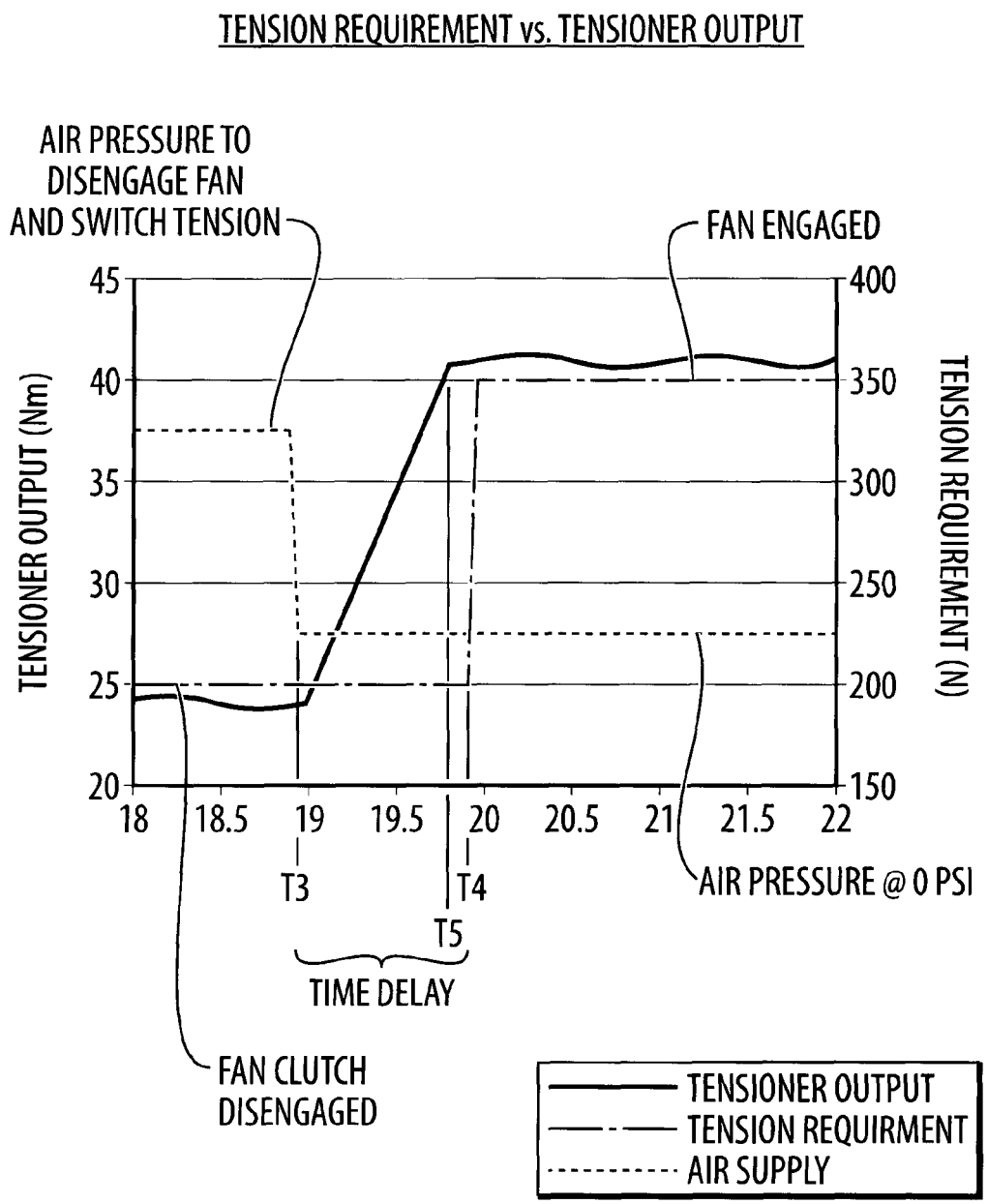
FIG. 7 is another graph illustrating a different scheme for control of the tensioner over a period of time.

In addition, as seen in FIG. 7, in order to ensure that there is adequate tension when the fan 918 re-engages, a delay may need to be added between when the air supply is disconnected from the actuator 31 and when the fan clutch 956 engages. That is, the tensioner output may be boosted by removing the pressurized air from the tensioner actuator 31 prior to the engaging the fan clutch 956 by pressurizing its actuator. In keeping with this control strategy, it can be seen in FIG. 7 that the air supply 970 is cut off from the cylinder 32 at time T3, but that the requirement for greater tension does not begin until time T4 (which is representative of when the fan clutch 956 reengages. It can be seen that at time T5, which precedes time T4 that the tensioner 10 is operating on high tension spring 30 (FIG. 2).

Figure 8:
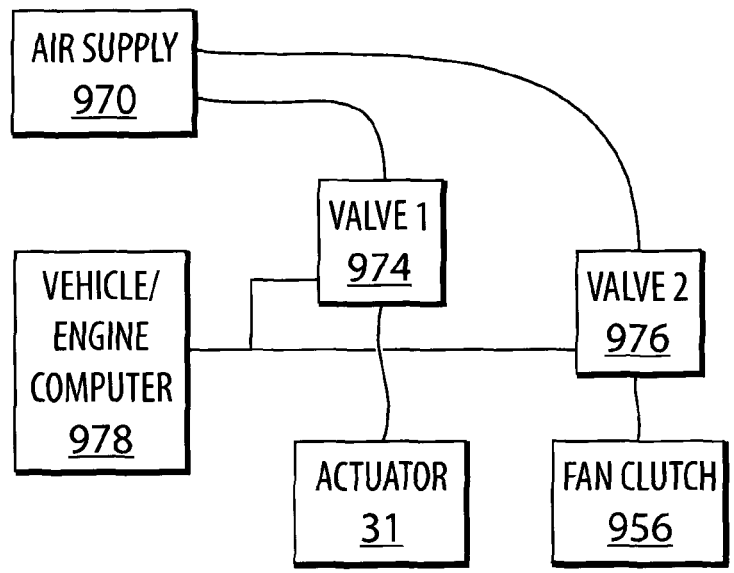
FIG. 8 is a block diagram illustrating the tensioner being controlled by an existing controller in the vehicle.
Figure 9:
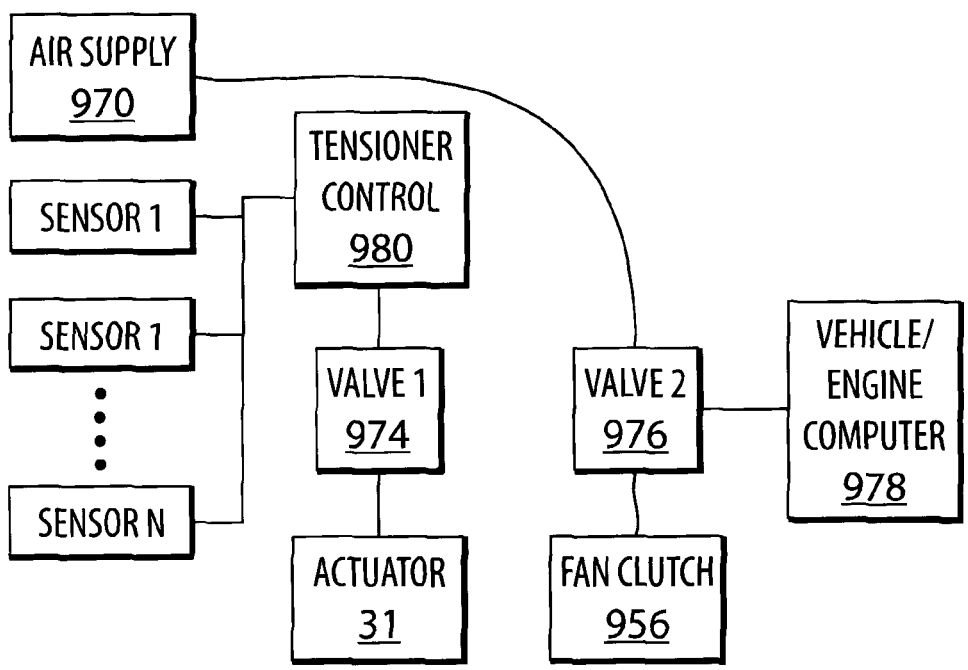
FIG. 9 is a block diagram illustrating the tensioner being controlled by its own controller.

FIG. 8 shows a particular control architecture wherein the pressurized air supply 970 to the tensioner actuator 31 and the fan clutch 956 are controlled by independent first and second valves 974 and 976 under control of the vehicle engine controller shown at 978. In another architecture shown in FIG. 9, an independent (or slave) electronic tension controller 980 controls valve 974 for connecting the pressurized air supply 970 to the tensioner actuator 31. The electronic tension controller 980 may receive inputs form a variety of sensors 982 such as thermocouples (e.g. for measuring the coolant temperature), pressure transducers, load cells, etc. These sensors 982 may communicate directly with the controller 980 or they may communicate with other vehicle or engine controllers (such as, for example, controller 978) over a data bus (e.g. a CAN bus) and the controller 980 may pick up the data from the sensors from the data bus.

The tensioner 10 may also be used in any other application where high and low tension levels may be desired. For example, the tensioner 10 may be used in conjunction with a starter/generator system where the accessory drive belt is used to drive motor/generator that functions as a starter to start an internal combustion engine or a generator to charge batteries when the internal combustion engine is operated. In this application the belt strand where the tensioner is located may require a high tension in the start mode and low tension in the generator mode. The tensioner 10 can also be used in a multi-drive system such as disclosed in PCT Patent publication WO2012/139224, filed 11 Apr. 2012, published Oct. 18, 2012, and entitled "Multi-Speed Drive for Transferring Power to a Load", the contents of which are incorporated herein in their entirety.

Figure 10A:
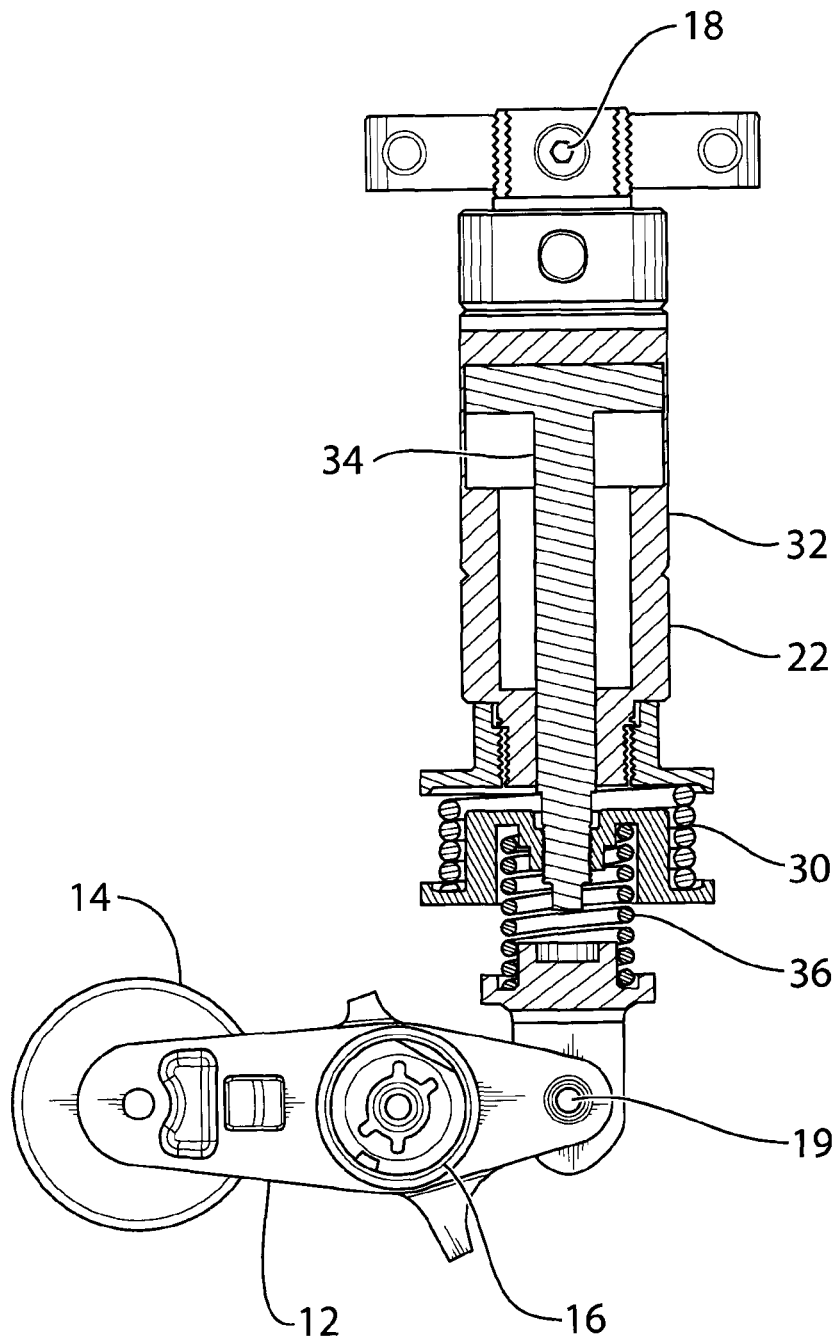
FIGS. 10A and 10B are elevation views of a variant of the tensioner shown in FIGS. 3A and 3B in which the pivot point for the tensioner arm is in a different position.
Figure 10B:
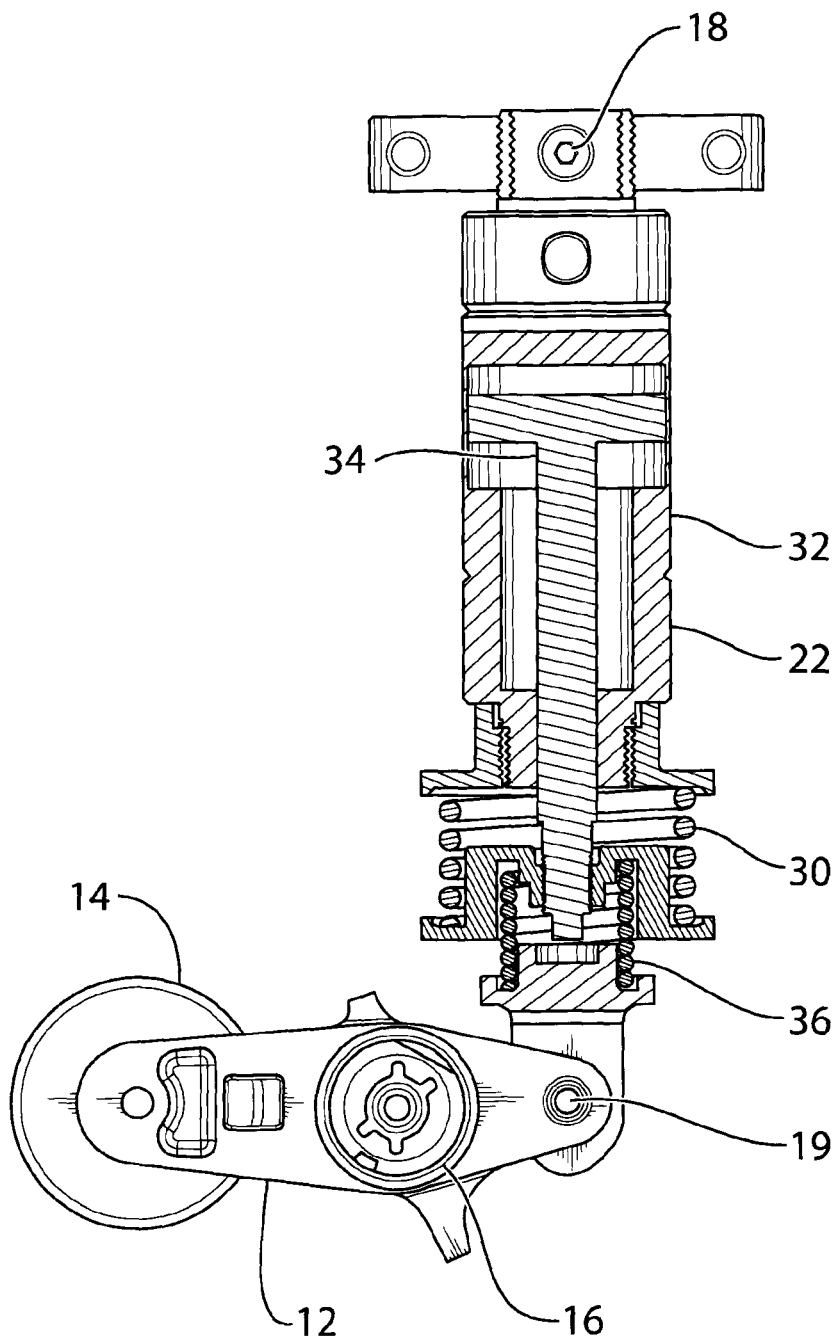

FIGS. 10A and 10B show a variant of the tensioner 10 wherein the tensioner arm 12 is provided as an elongate element with the tensioner pivot being disposed in line between the pulley pivot and strut connecting body pivot. FIG. 10A shows the variant in a low tension mode and FIG. 10B shows the variant in a high tension mode, similar to FIGS. 2A and 2B.

Figure 11A:
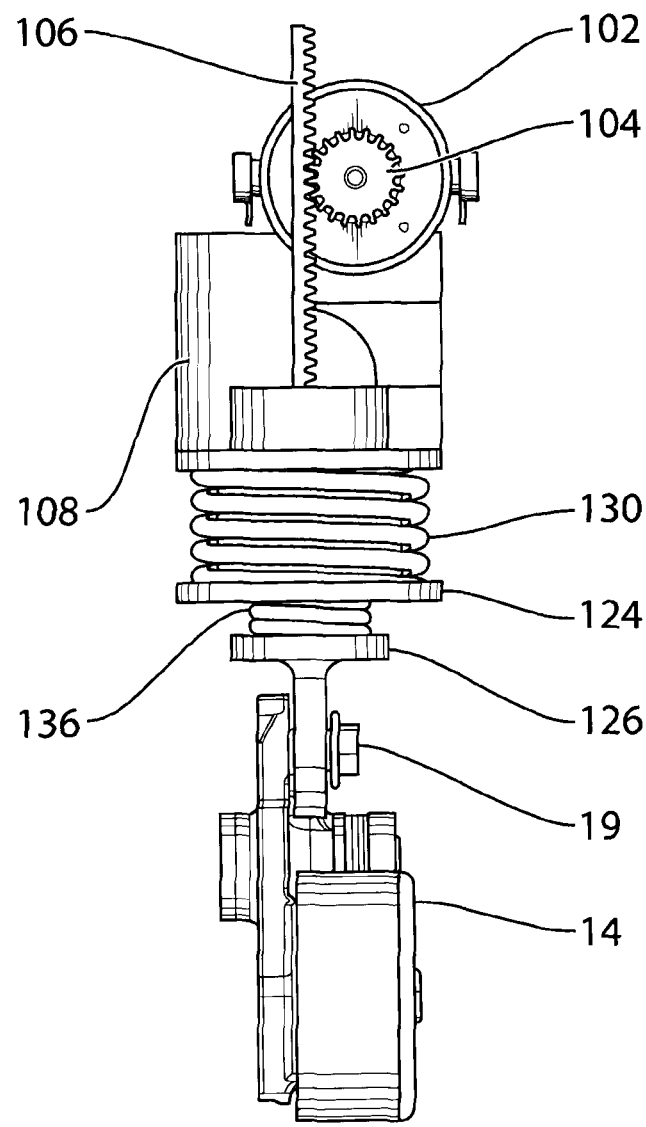
FIGS. 11A and 11B are elevation views of another embodiment of a tensioner in which an electric motor and gear system are used to control the spring rate for the tensioner.
Figure 11B:
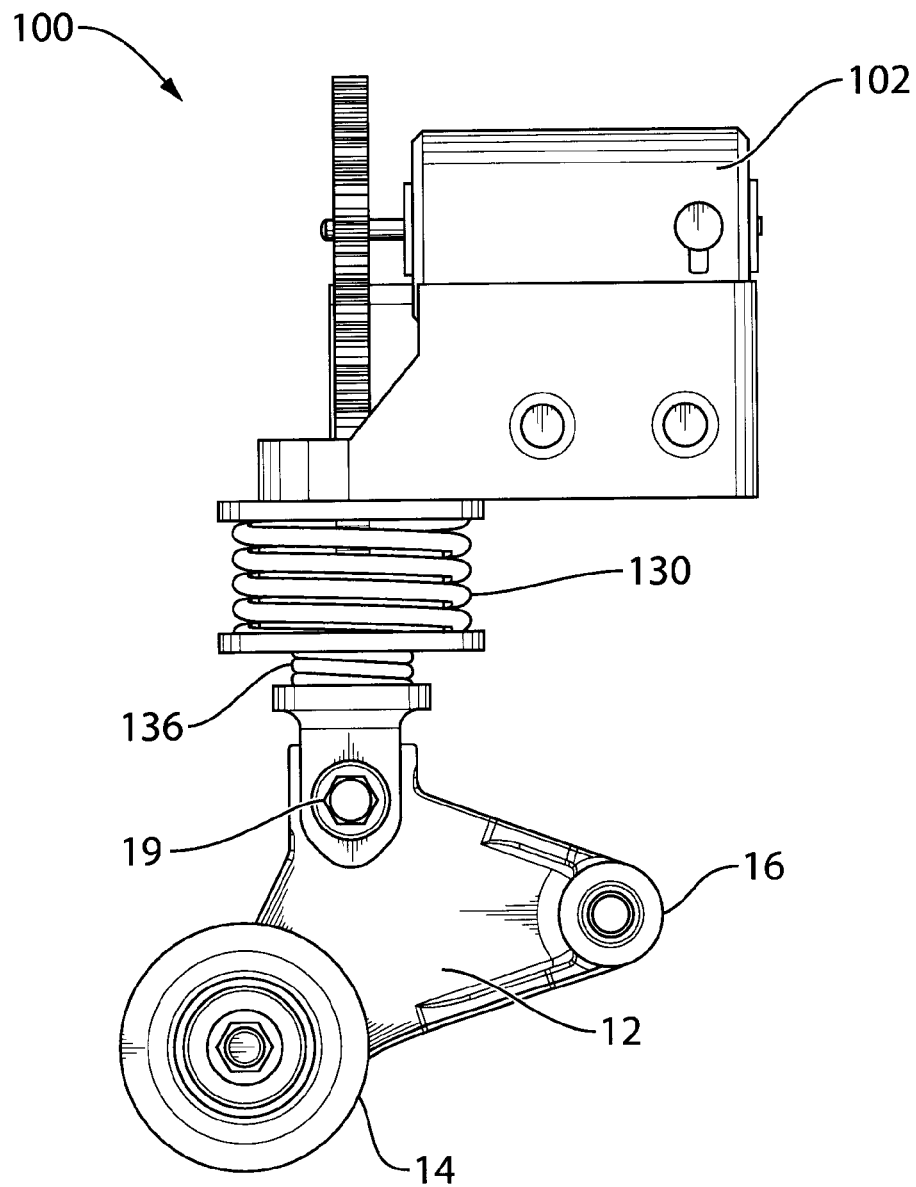

As an alternative to a pneumatic actuator, other types of actuators may be employed to position the first moveable body 24. FIGS. 11A and 11B show an example of a tensioner 100 with an electric motor 102 as part of the actuator. The electric motor 102 drives a pinion 104 that in turn drives a rack 106 that is slidably supported by backing 108. The rack 106 is connected to a first moveable body 124, and a second moveable body 126 is slidably connected to the first moveable body for telescopic movement therewith. When the motor 102 is de-energized the high tension spring expands and collapses low tension spring 136. The oscillatory movement of the tensioner 100 is translated into the reciprocating translation of the moveable body 124 and the rack 106, which is free to translate subject to the resistance provided by the unpowered motor. This resistance may effectively add to or independently provide the required damping for the tensioner. When the motor 102 is energized the rack 106 is translated to move the moveable body 124 so as to compress the high tension spring 130. In order to avoid having to continually energize the motor to maintain the position of the rack 106 in this state, the system may include a locking pin or some other mechanism to lock the rack and pinion in position. While a pivot connector 18 is not shown in FIGS. 11A and 11B, it will be understood that one is provided so as to mount that end of the actuator pivotally to the engine block from engine 913.

In general, an electric motor will give a slower response time than will an actuator that is pneumatically or hydraulically.

Figure 12:
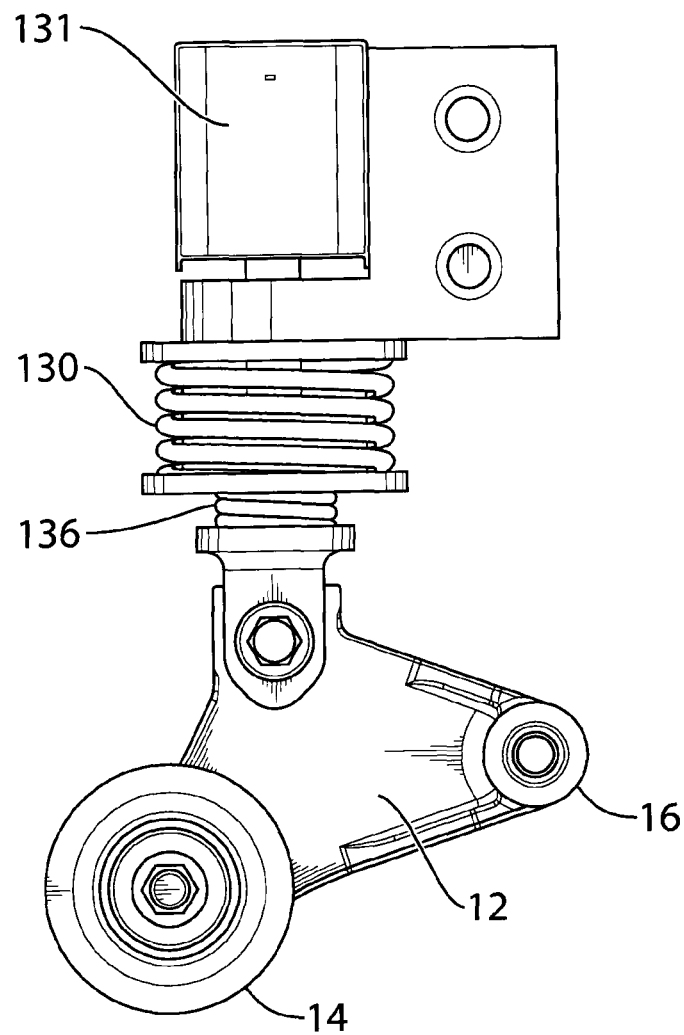
FIG. 12 is an elevation view of another embodiment of a tensioner in which a solenoid is used to control the spring rate for the tensioner.

FIG. 12 shows an example of a dual spring tensioner with a solenoid 131 as the actuator. The solenoid 131 replaces the electric motor 102 shown in FIGS. 11A and 11B. The solenoid 131 shown in FIG. 12 is a two-position linear solenoid. The solenoid 131 may be any suitable type of linear solenoid, such as one in which the coil is energized to retract the plunger, or if the solenoid 131 were oriented the opposite way, it could be energized to extend. The solenoid 131 could alternatively be a rotary solenoid. In the embodiment shown, the solenoid 131 may be one in which the coil is energized to retract the plunger. In the event of a failure of the solenoid 131 to be operable, the solenoid 131 will remain extended, leaving the tensioner in a high tension mode and therefore able to handle both low and high tension events during operation of the engine.

Figure 13A:
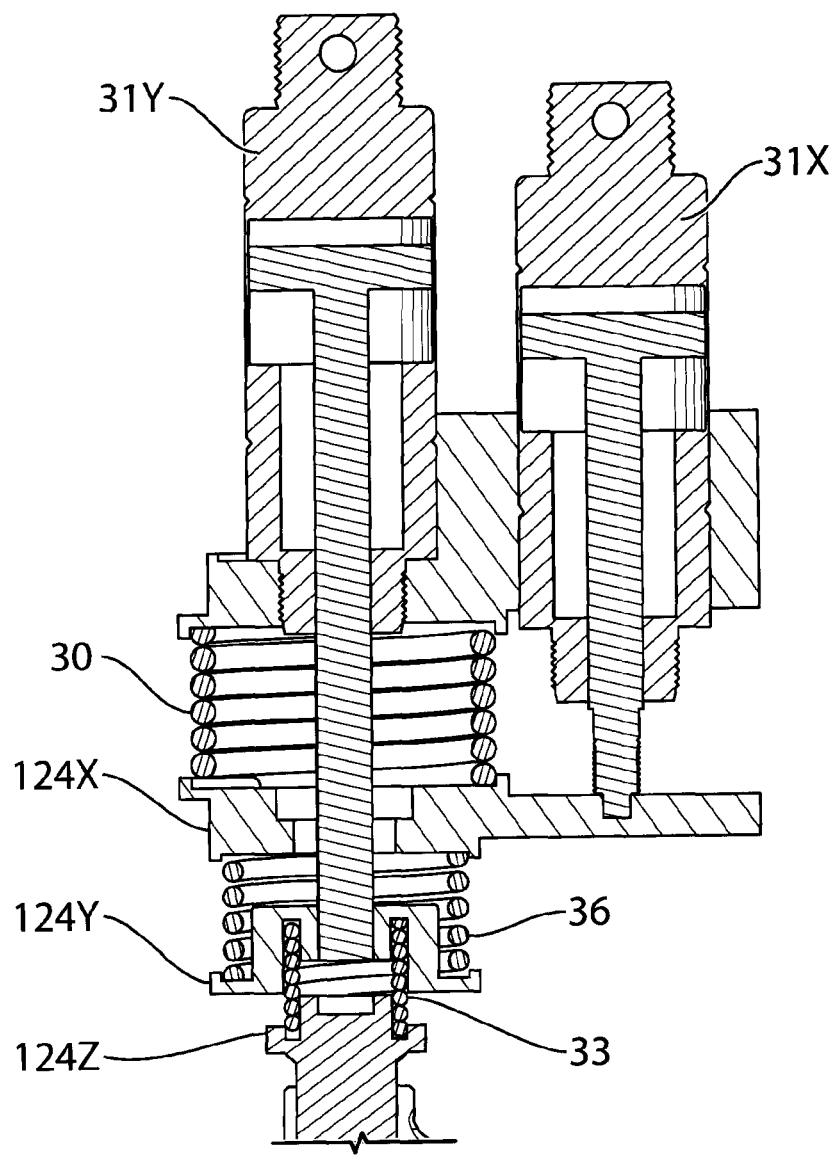
FIGS. 13A and 13B are elevation views of another embodiment of a tensioner in which there are three springs, giving the tensioner three different tension modes.
Figure 13B:
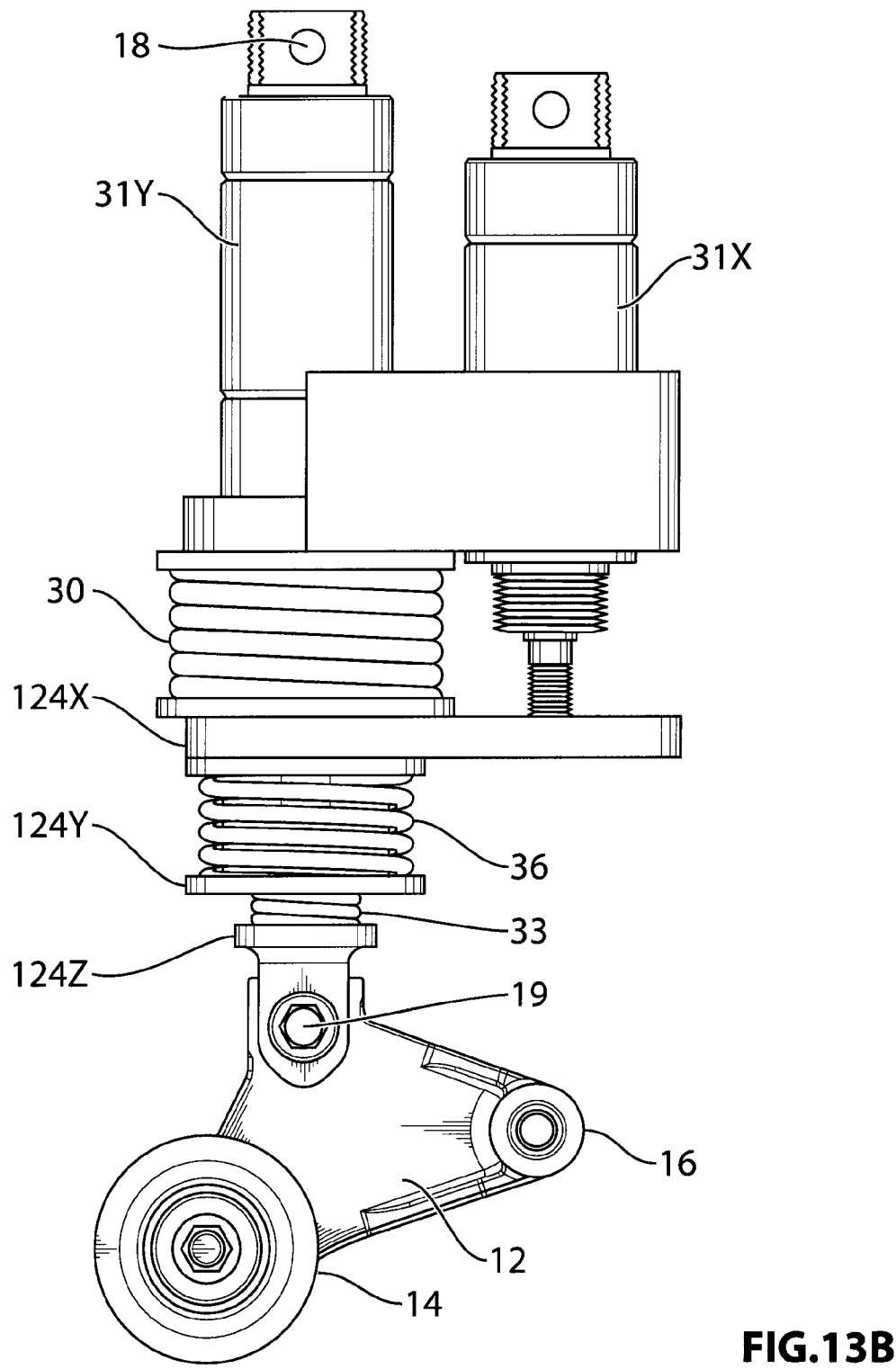

FIGS. 13A and 13B show an example of a tensioner that utilizes more than two springs having different spring rates. In this case there are three springs, shown individually as a first spring 30 having a first spring rate, a second spring 36 having a second spring rate that is lower than the first spring rate, and a third spring 33 having a third spring rate that is lower than the second spring rate. For convenience the first, second and third springs 30, 36 and 33 may be referred to as the high, medium and low tension springs respectively or high, medium and low rate springs respectively. Additionally, the tensioner includes three moveable bodies 124X and 124Y and 124Z and two pneumatic actuators shown at 31X and 31Y, providing high, medium and low tension levels. The base 22 includes the housings of both actuators 31X and 31Y.

The first body 124X is movable relative to the base 22; the second body 124Y is movable relative to the first body 124X and the third body 124Z is movable relative to the second body 124Y. The first spring 30 is connected between the base 22 and the first body 124X; the second spring 36 is connected between the first body 124X and the second body 124Y, and the third spring 33 is connected between the second body 124Y and the third body 124Z. The third body 124Z engages the arm 12.

The first actuator 31X is positionable in a first state in which it fixes the position of the first body 124X relative to the base, and a second state in which it permits movement of the first body 124X relative to the base by the first spring 30. The second actuator 31Y is positionable in a first state in which it fixes the position of the second body 124Y relative to the first body 124X, and a second state in which it permits movement of the second body 124Y relative to the first body 124X by the second spring 36.

To establish a low tension mode, the two pneumatic actuators 31X and 31Y may be activated (placed in their respective first states) to retract the first and second moveable bodies 124X and 124Y so as to collapse the high and medium tension springs 30 and 36, leaving the low tension spring 33 to resiliently respond to oscillations of the tensioner arm 12 (FIG. 13B). To establish a high tension mode, neither of the pneumatic actuators 31X and 31Y would be activated to retract (thereby placing them in their respective second states), in which case the high tension spring 30 would drive the first and second bodies 124X and 124Y forward to collapse the medium and low tension springs 36 and 33, leaving only the high tension spring 30 to resiliently respond to oscillations of the tensioner arm 12 (FIG. 13B). To establish a medium tension mode, only the pneumatic actuator 31X which is operatively connected to the first movable body 124X would be activated to retract (thereby placing the first actuator 31X in its first state), while leaving the second actuator 31Y unactivated (thereby placing the second actuator 31Y in its second state) so as to collapse the high tension spring 30 only, in which case the medium tension spring 36, having a higher spring rate than the low tension spring 33, would collapse the low tension spring 33, leaving only the medium tension spring 36 to resiliently respond to oscillations of the tensioner arm. FIGS. 13A and 13B show the tensioner in the medium tension setting.

It will be noted that in the embodiment shown in FIGS. 13A and 13B, the pivot connector 18 is at an end of the actuator 31Y, and the housings of actuators 31X and 31Y are part of the base 22 and are thus fixedly connected together. It is alternatively possible for the pivot connector 18 to be on actuator 31X, or to be on a base plate that both actuators 31X and 31Y are mounted to, and which is in turn mounted to the engine block from engine 913.

It will be further noted that, in the embodiment shown in FIGS. 13A and 13B, the second movable member 124Y is engaged with the tensioner arm 12 at least indirectly through the third movable member 124Z (and through the third spring 33).

It will be understood that the concept shown in FIGS. 13A and 13B can be extended with more than three springs to provide more than three tension levels.

A variety of modifications may be made to the above described embodiments. For example, the base 22 may be pivotally connected to the arm 12 and the second body 26 may be pivotally connected to the engine block from engine 13. The tensioner operates in the same manner. This effectively reverses the positions of the high rate spring 30 and the low rate spring 36. Nevertheless, the actuator collapses the high rate spring for the low tension mode and the high rate spring collapses the low rate spring for the high tension mode.

Figure 14:
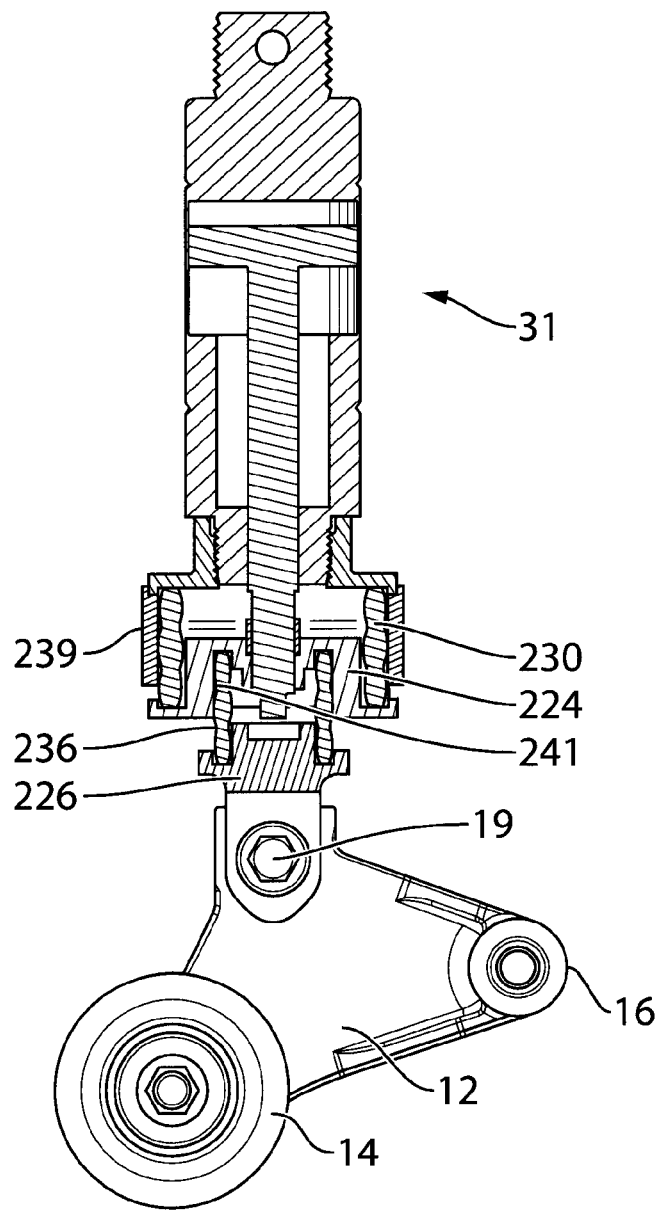
FIG. 14 is an elevation view of another embodiment of a tensioner in which the springs are made from a closed cell foam.

In addition, the high and low rate coil springs 30 and 36 may be replaced with other types of resilient members such as elastomeric bodies, such as, in particular, closed cell foam springs. An example of a tensioner that incorporates first and second closed cell foam springs (shown at 230 and 236 respectively) is shown in FIG. 14. A retaining sleeve 239 is shown surrounding the first spring 230, while the second spring 236 is surrounded by the bore 241 in the first movable member 224. The sleeve 239 and the bore 241 may inhibit buckling of the closed cell foam springs 230 and 236. Additionally, they may contribute to damping in the springs 230 and 236 due to frictional contact with the surfaces of the springs 230 and 236. Closed cell foam springs, however, can be engineered to avoid billeting under compressive loads, and so the damping provided by the sleeve 239 and bore 241 may be relatively small. The closed cell foam springs 230 and 236 themselves, however, provide damping inherently as a result of the collapse of the individual cells that make them up. The amount of damping provided by the springs 230 and 236 can be provided as appropriate for the particular application. The tensioner shown in FIG. 14 may otherwise be similar to the tensioner 10 shown in FIGS. 3A and 3B. An advantage to closed cell foam springs however is that they can collapse to a very small fraction of their rest length as compared to typical helical coil compression springs. In some cases closed cell foam springs can collapse to 20% of their rest length. This can be of assistance in maintaining a relatively compact overall size for the tensioner shown in FIG. 14 while still maintaining a useful amount of stroke (so as to provide a useful range of tensioner arm movement).

Figure 15:
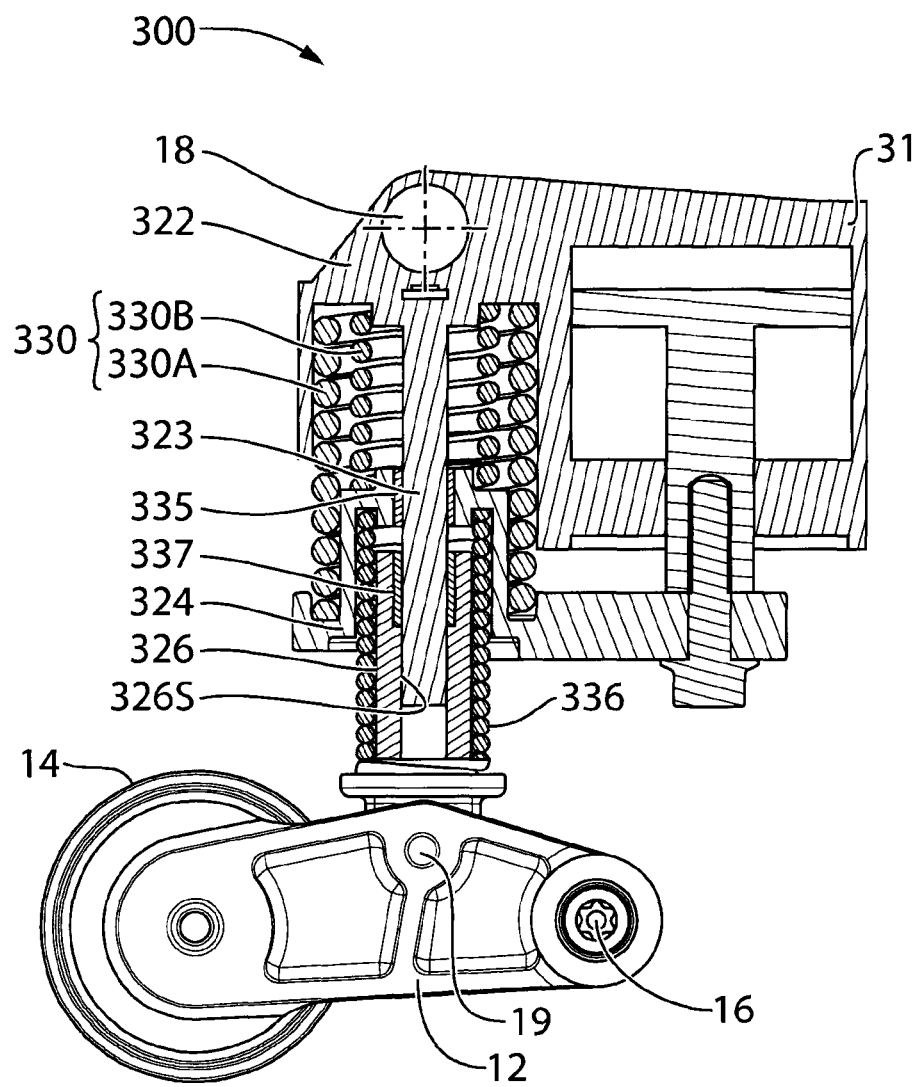
FIG. 15 is an elevation view of another embodiment of a tensioner in which one of the springs is a compound spring itself including two spring members.

FIG. 15 shows another embodiment of a tensioner shown at 300. The tensioner 300 may be similar to the tensioner 10 shown in FIGS. 3A and 3B, but the tensioner 300 has a first spring 330 that is itself a compound spring that includes two spring members shown at 330A and 330B. The two spring members 330A and 330B act in parallel with one another, to provide the compound spring 330 with a spring rate K1 that is the sum of the spring rates K1A and K1B for the two spring members 330A and 330B. The two spring members 330A and 330B may have different spring rates or the same spring rate, as desired. The spring members 330A and 330B are shown as being nested and co-axial, however in other embodiments, the two spring members 330A and 330B could be adjacent one another and not co-axial. The tensioner 300 further includes a second spring 336, which has a second spring rate K2 that is lower than the spring rate K1. It will be noted that the spring rate K2 need not be lower than the individual spring rates K1A and K1B of the two first spring members 330A and 330B.

The spring rate of the tensioner 300 may be controlled between K1 and K2 via the actuator 31, which is operatively connected to the first movable body shown at 324, in similar manner to the control over the spring rate of the tensioner 10 by the actuator 31 in FIGS. 3A and 3B.

A central guide rod 323 of the base shown at 322 extends into a bore 326S of the second movable body shown at 326. The central guide rod 323 also passes through a bore 324S in the first movable body 324. Optional bushings shown at 335 and 337 are provided in the bores 324S and 326S of the first and second movable bodies 324 and 326, for sliding engagement with the central guide rod 323. These bushings 335 and 337 may be used to provide damping or simply to inhibit metal to metal contact between the guide rod 323 and the first and second bores 324S and 326S.

While the spring 330 has been shown to be a compound spring, it is additionally or alternatively possible for the spring 336 to be provided as a compound spring.

Figure 16A:
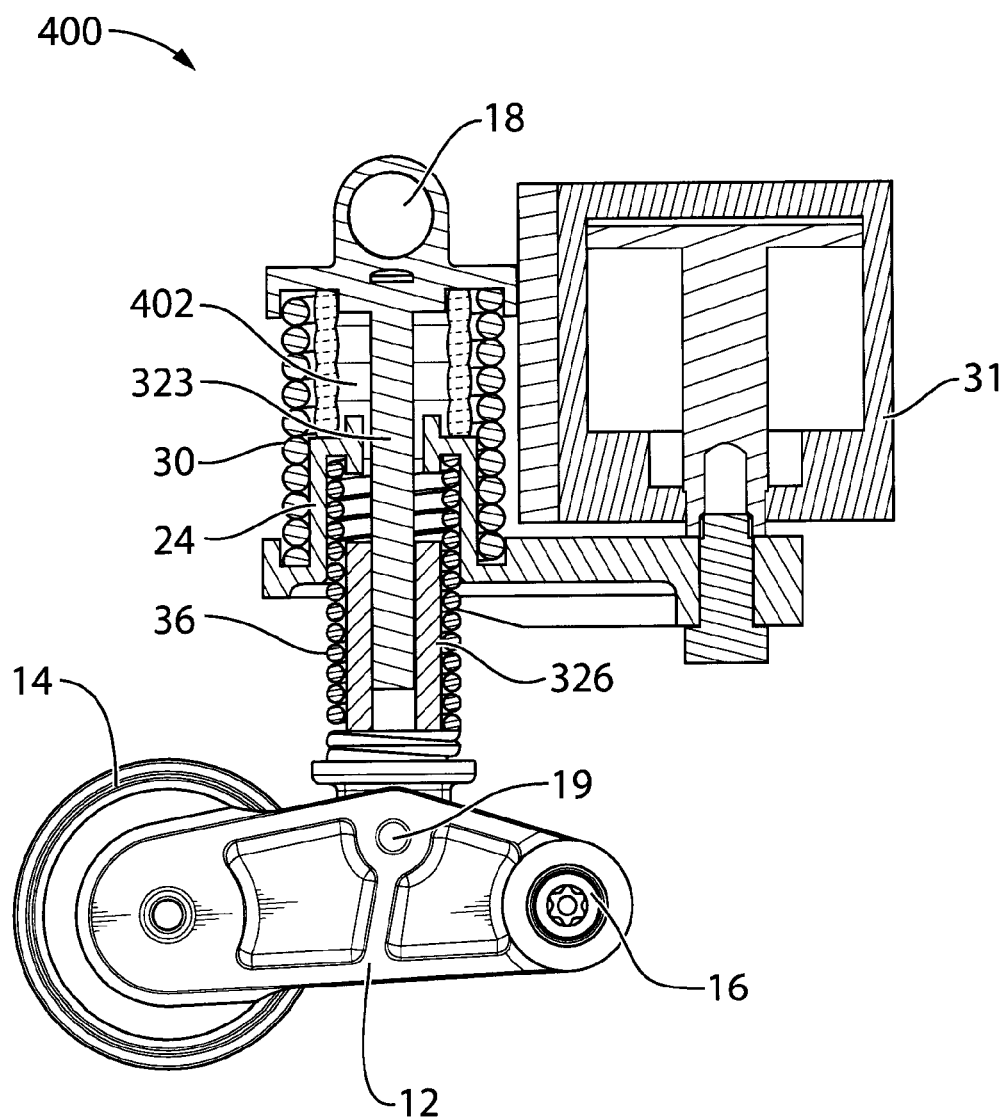
FIGS. 16A and 16B are elevation views of another embodiment of a tensioner in which a bumper is provided to reduce the likelihood of damage to the tensioner from a high belt tension event.
Figure 16B:
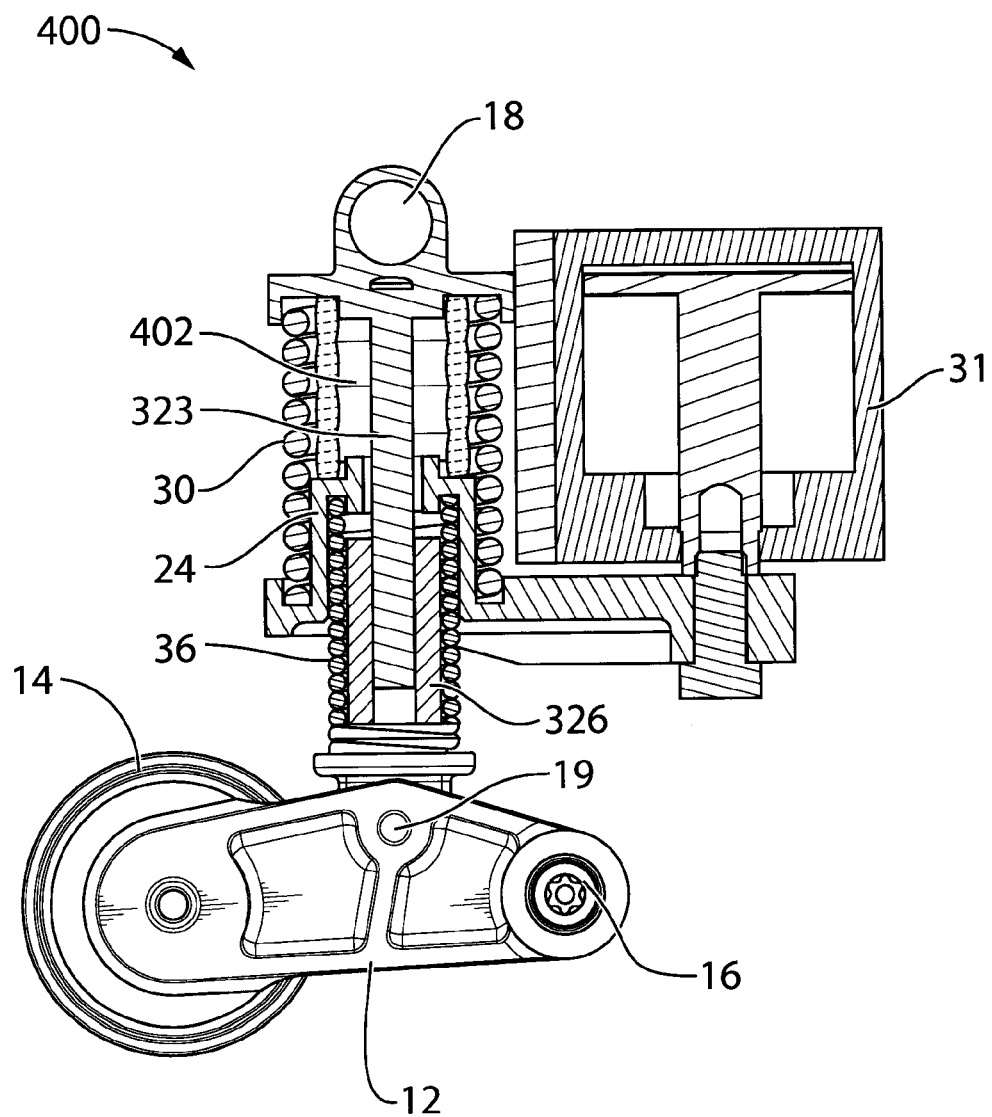

Reference is made to FIGS. 16A and 16B which show a tensioner 400 that may be similar to the tensioner 10 except that the tensioner 400 includes a compressible bumper 402 nested within the first spring 30. During normal operation of the tensioner 400, the bumper 402 is not engaged with the first movable member 24, and so the bumper 402 is not intended to cooperate with the spring 30 to form a compound spring, as is the case for the spring members 330A and 330B in FIG. 15. Instead, during use of the tensioner 400, in the event that the arm 12 is driven upwards (in the view shown) to compress the first spring 30, the first movable body 24 will engage the bumper 402 prior to the first spring 30 going solid (i.e. prior to the first spring 30 being fully collapsed such that its coils are all in contact with one another).

The spring rate of the bumper 402 may be higher than that of the first spring 30, or it may be the same or lower. In a preferred embodiment, the spring rate of the bumper 402 is higher. When the tension in the belt 914 increases to a point where the belt 914 drives the first body 24 sufficiently hard that it would otherwise cause full (i.e. maximum) collapse of the first spring 30, the bumper 402 is positioned to engage the belt 914 slightly prior to full compression of the first spring 30 such that the bumper 402 and the first spring 30 act in parallel on the arm 12 (and therefore on the belt 914) and increase the effective spring rate of the tensioner 400 sufficiently to match the belt tension prior to the first spring 30 reaching full collapse. The bumper 402 may be made from any suitable material such as, for example, rubber. In such an embodiment, when the actuator 31 is in the second state, so as to fix the position of the first body 24 relative to the base 22, the spring 30 may not be fully collapsed due to the presence of the bumper 402. However, the first body 24 will still be fixed in position relative to the base 22.

Figure 17:
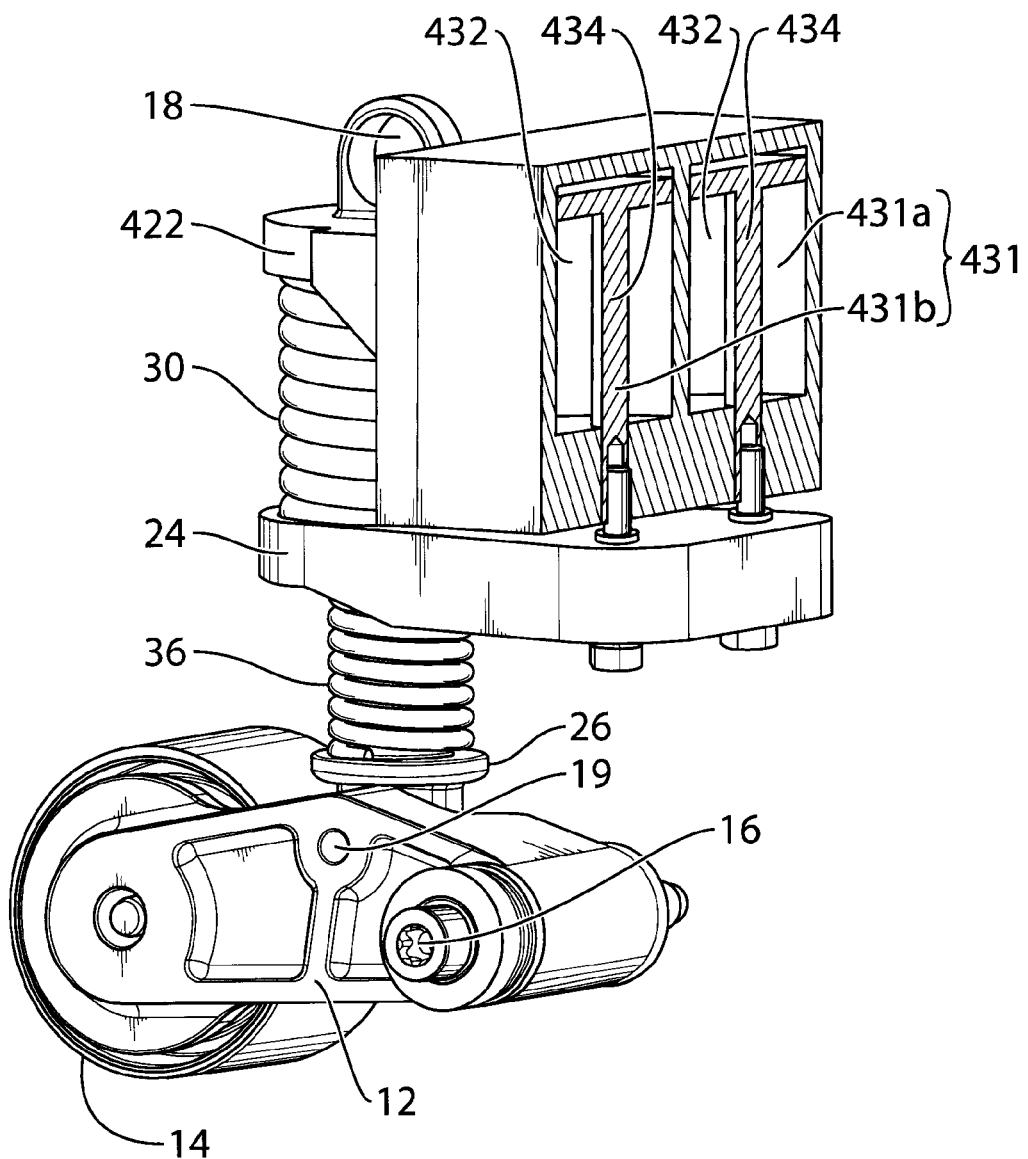
FIG. 17 is a perspective view of another embodiment of a tensioner in which the actuator is a compound actuator including two actuation structures.

Reference is made to FIG. 17, which shows another tensioner 450, which may be similar to the tensioner 10 shown in FIGS. 3A and 3B except that the tensioner 450 includes an actuator 431 that is a compound actuator which comprises two actuation structures 431a and 431b. Each of the actuation structures may be, for example, pneumatic actuation structures, each including a cylinder 432 and a piston 434. Each of the actuation structures 431a and 431b are connected to the first movable body 24, so that actuation of the actuation structures 431a and 431b causes movement of the first movable body 24. Control of the tensioner 450 may be similar to control of the tensioner 10.

By forming the actuator as a compound actuator the overall envelope of the tensioner can be modified to suit a particular application where there may be a space restriction in some way that would prevent the use of a single actuation structure (e.g. a single piston cylinder arrangement that has a larger diameter than the two smaller pistons 434 and cylinders 432).

Figure 18:
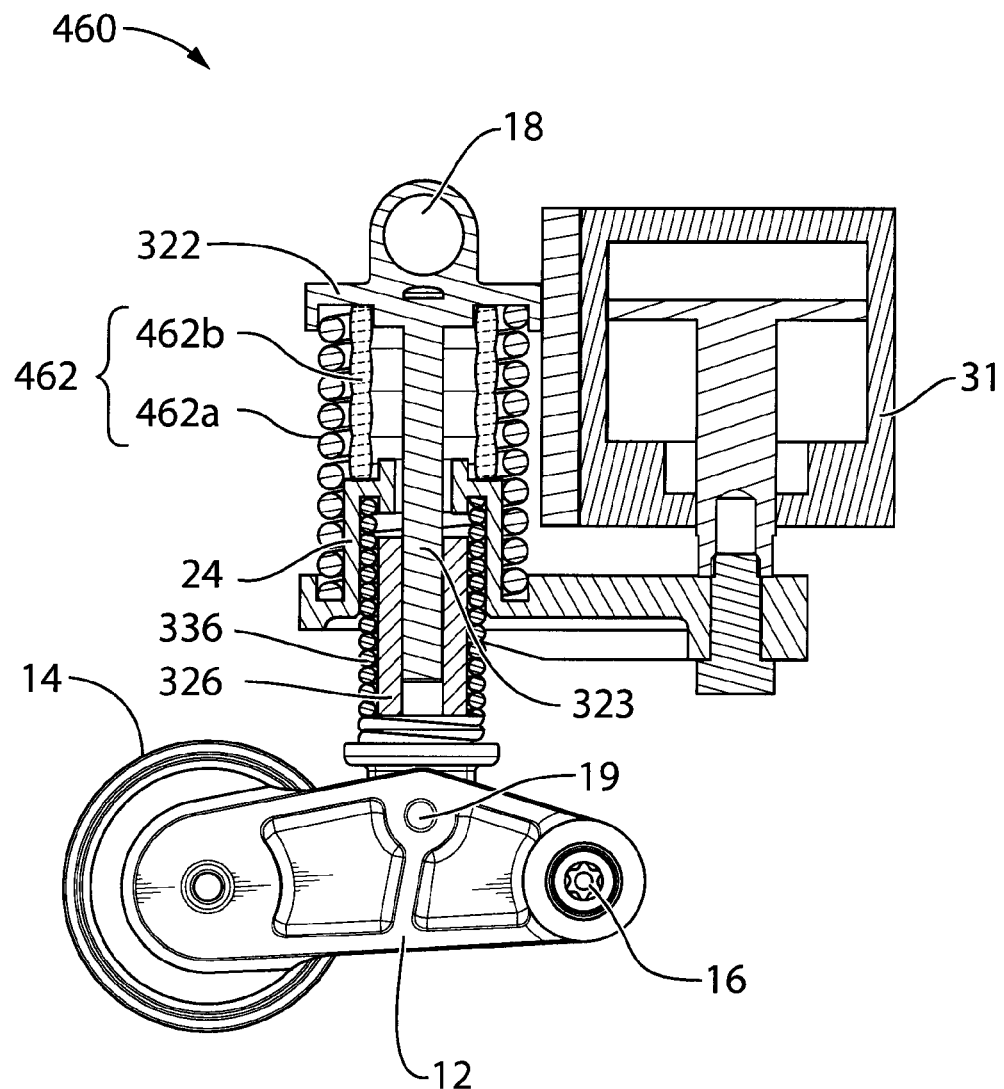
FIG. 18 is an elevation view of another embodiment of a tensioner in which one of the springs is a compound spring made up of two different types of spring members.

Reference is made to FIG. 18, which shows a tensioner 460 that may be similar to the tensioner 300 (FIG. 15) and which includes a compound spring 462 that may be similar to the compound spring 330 but which includes two different types of spring. In the example shown, the compound spring 462 includes a first spring member 462a which is a helical coil compression spring, and a second spring member 462b which is an elastomeric closed cell foam spring. The tensioner 460 further includes the first movable body 324, the second movable body 326, the second spring 336 and the actuator 31. Aside from the use of two different types of spring for the compound spring 462, the operation and structure of the tensioner 460 may otherwise be similar to the operation and structure of the tensioner 300 (FIG. 15).

Figure 19:
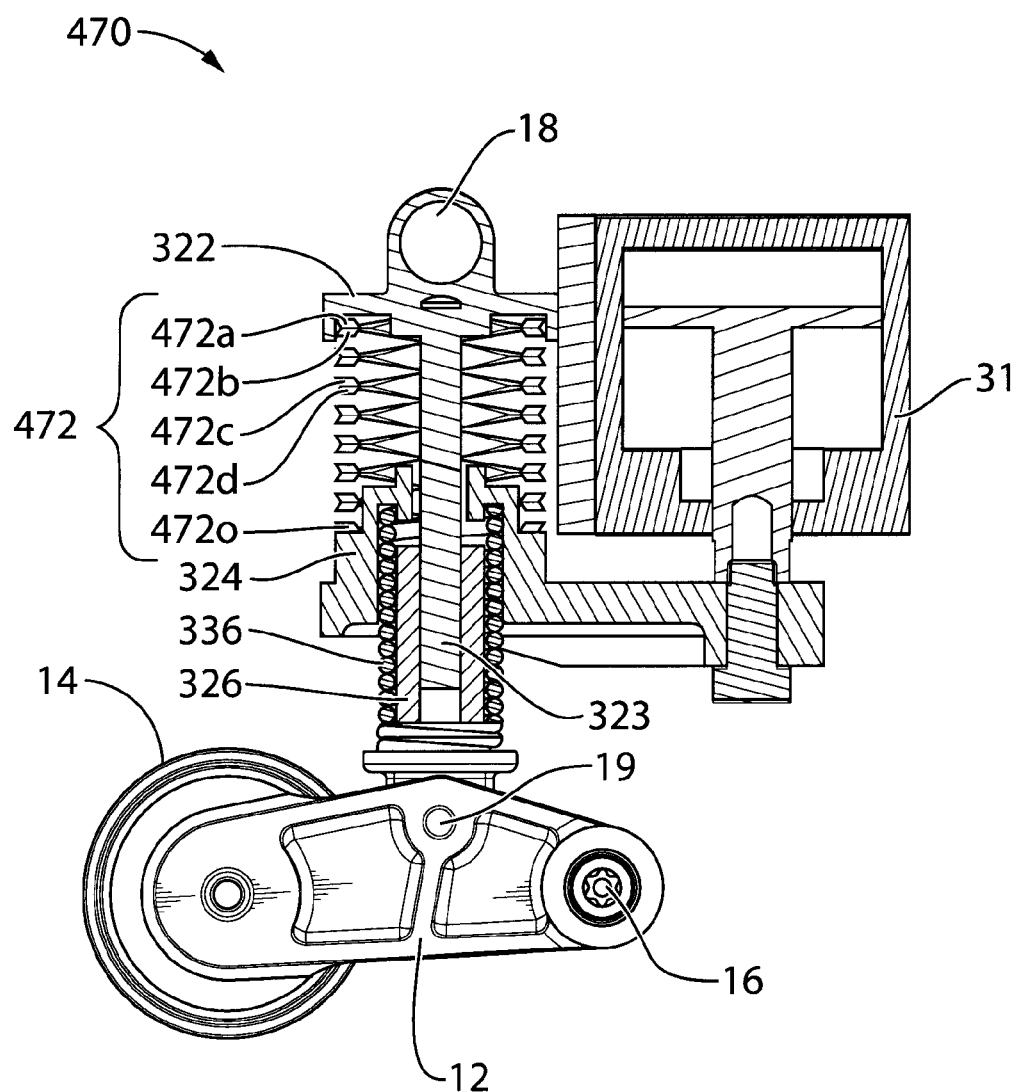
FIG. 19 is an elevation view of another embodiment of a tensioner in which one of the springs is a compound spring made up of a plurality of spring members in series.

Reference is made to FIG. 19, which shows a tensioner 470 that may be similar to the tensioner 300 (FIG. 15) but which has a first spring 472 that is a compound spring which includes a plurality of spring members 472a, 472b, 472c, 472d, . . . 472o, each having its own spring rate, K1a, K1b, K1c, K1d . . . K1o. In the embodiment shown, the spring members 472a-472o are in series. As a result, the overall spring rate K1 for the spring 472 is determined by the following equation: 1/K1=1/K1a+1/K1b+1/K1c+1/K1d+1/K1o. The individual spring members 472a-472o need not have the same spring rates, or alternatively they may all have the same spring rate. The individual spring members 472a-472o may be any suitable type of spring members, such as, for example wave washers. The tensioner 470 further includes the first movable body 324, the second movable body 326, the second spring 336 and the actuator 31. Aside from the use of two different types of spring for the compound spring 472, the operation and structure of the tensioner 470 may otherwise be similar to the operation and structure of the tensioner 300 (FIG. 15).

While the spring 472 has been shown to be a compound spring, it is additionally or alternatively possible for the spring 336 to be provided as a compound spring.

Figure 20:
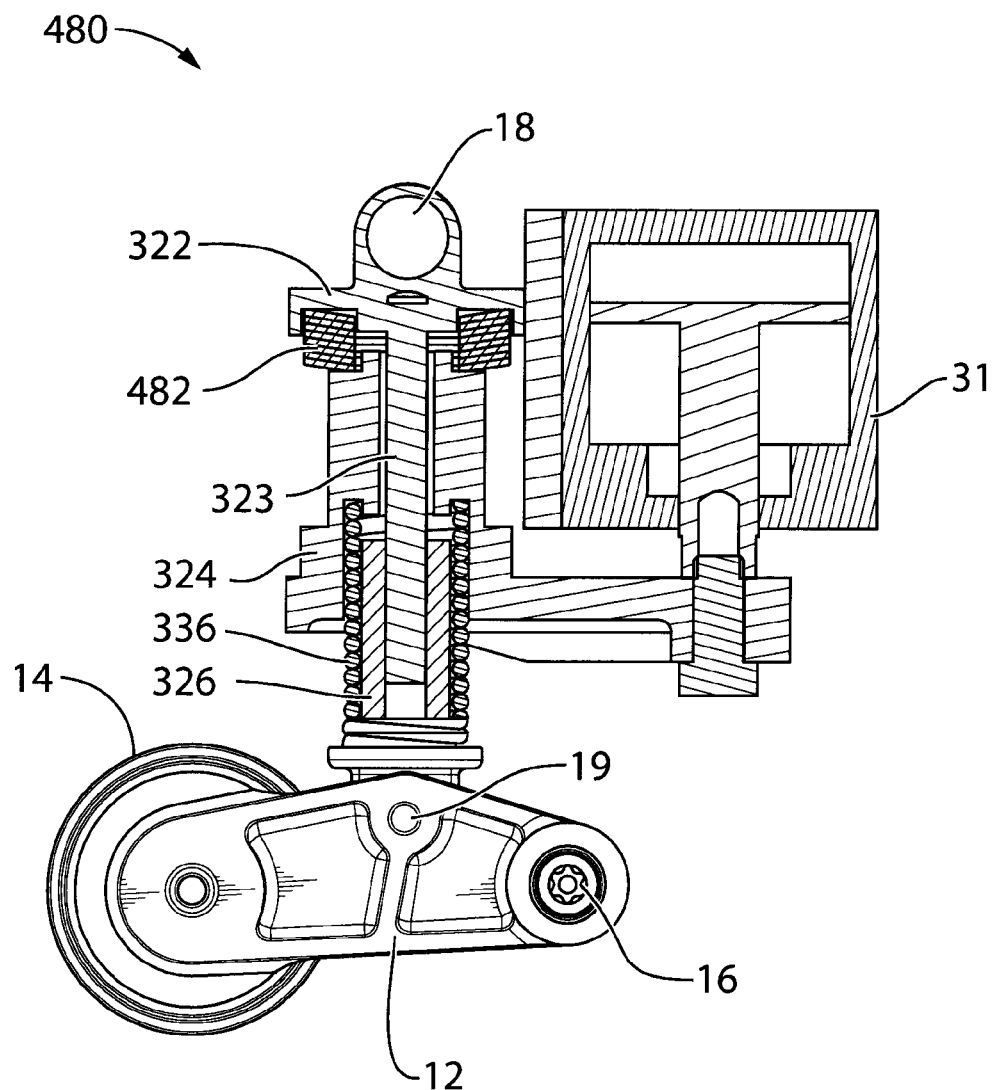
FIG. 20 is an elevation view of yet another embodiment of a tensioner in which one of the springs is a compound spring made up of a plurality of spring members in series.

Reference is made to FIG. 20, which shows another tensioner 480. The tensioner 480 may be similar to the tensioner 470 but uses a plurality of Belleville washers which are nested to make up the first spring shown at 482, instead of using wave washers that are not nested.

Figure 21:
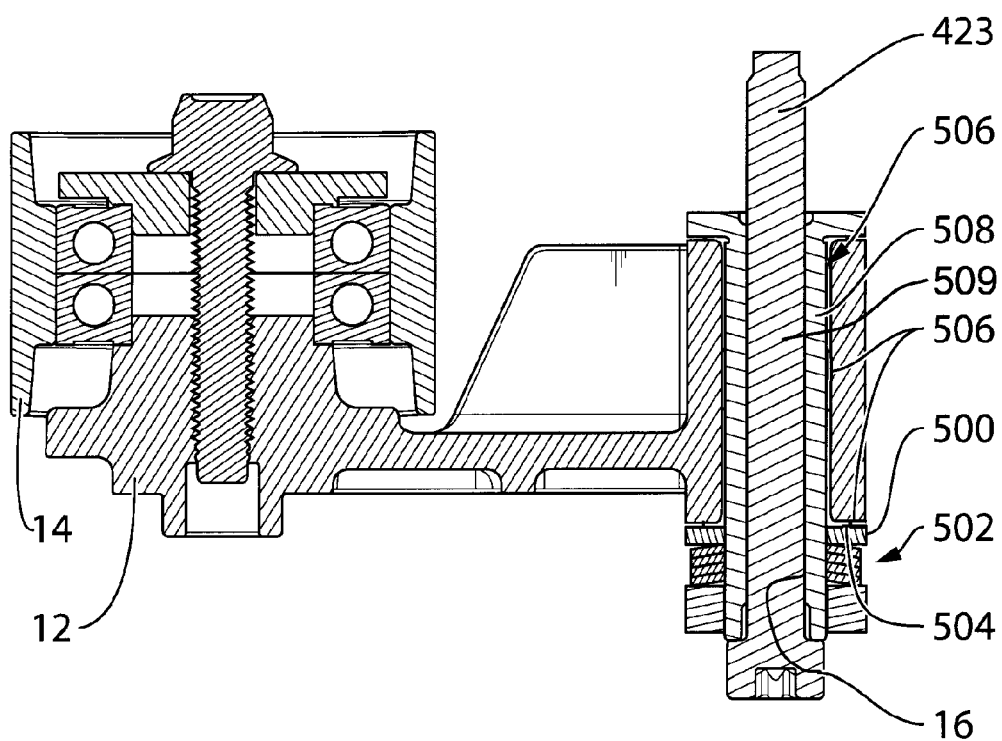
FIG. 21 is a section view of portions of the tensioner which show a damping structure for the tensioner.

Reference is made to FIG. 21, which shows a damping structure that can used as part of any of the tensioners described above. The damping structure includes a damping disc 500 and a plurality of friction disc biasing members shown at 502. The damping disc 502 is urged into frictional engagement with a friction surface 504 on a pivot bushing 506 that supports the tensioner arm 12. The biasing members 502 may be, for example, Belleville washers. Also shown is a pivot shaft 508 with an aperture (which is the pivot connector 16) through which a pivot bolt 509 passes, a front disc that is mounted to the pivot shaft 508 and positioned to compress the washers 502, and a second pivot bushing 506. The general damping structure shown in FIG. 21 may be similar to the damping structure described in US Patent publication US2008/0280713, the contents of which are incorporated herein by reference.

Figure 22A:
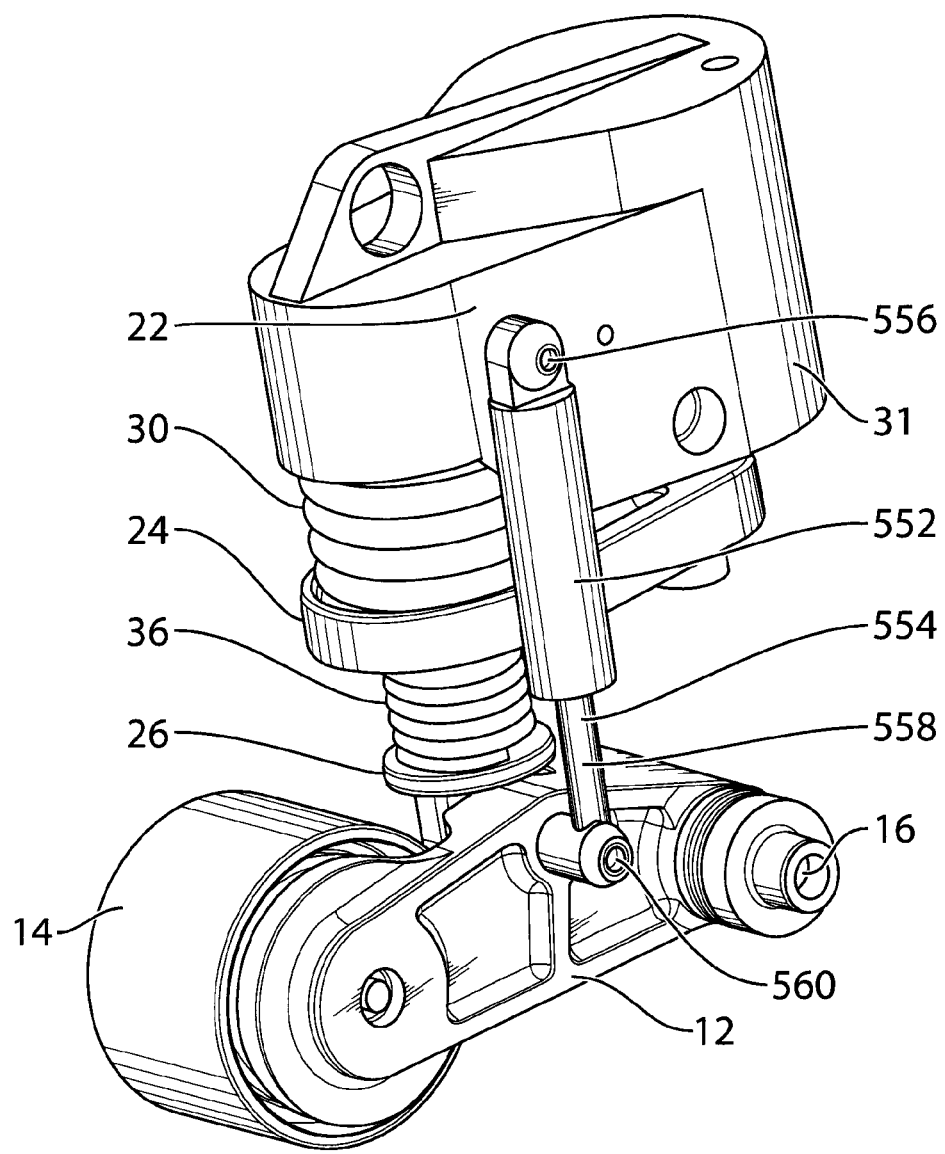
FIGS. 22A and 22B are perspective and side elevation views that show an alternative damping structure for the tensioner.
Figure 22B:
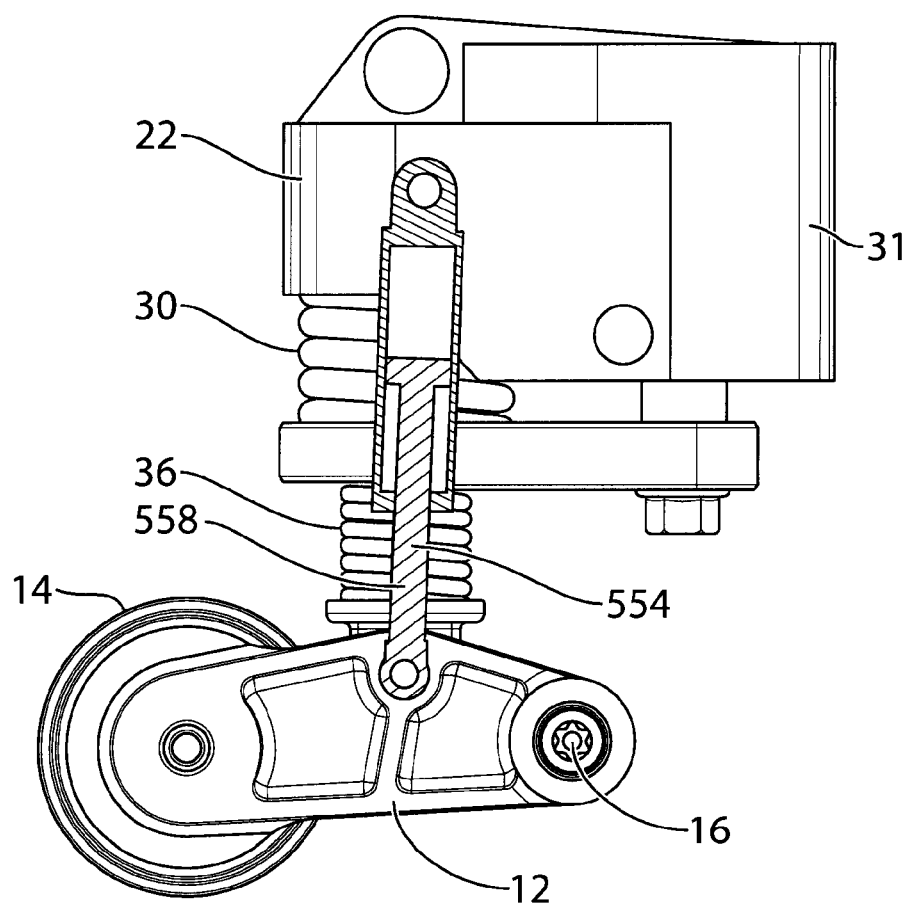

Another type of damping structure that can be used for the tensioner is provided by a damping strut 550 as shown in FIGS. 22A and 22B. The damping strut 550 includes a cylinder housing 552 and a piston 554. The cylinder 552 has an end 556 that is pivotally mounted to the tensioner base shown at 22. The piston 554 includes a rod 558 that has an end 560 that is pivotally mounted to the tensioner arm 26.

As is known in the art of damper struts, a pass-through aperture is provided in the piston 554 or between the piston 554 and the wall of the cylinder 552, which permits fluid in the cylinder 552 to pass from one side of the piston 554 to the other, thereby creating resistance to movement of the tensioner arm 12, or damping.

In at least some instances, it is possible to provide damping that is asymmetric in the sense that, when the tensioner arm 12 moves towards the belt (i.e. towards a free arm position), there is relatively little damping, but when the tensioner arm 12 moves away from the belt (i.e. towards a load stop position), the damping is relatively high. This can be achieved in any suitable way, such as by providing the damping member with a surface finish that is directional, similar, for example, to a plurality of overlapping scales. Such a surface finish would permit relatively low friction in one direction but higher friction in the opposite direction as the edges of the scales engage and dig into the surface with which the damping member is engaged.

Aside from the above, other damping structures may be used for the tensioner, such as, for example, any of the damping structures shown and described in U.S. Pat. Nos. 6,165,091 and 4,698,049, PCT Patent publication WO2006099731 and German Patent publication DE19524403.

For greater certainty, any of the rotary damping structures that are shown and described, which are directly engaged by pivoting of the tensioner arm 12 (such as the structure shown in FIG. 21), may be used in addition to any of the linear damping structures that are associated with the retraction and extension of the strut 20 (such as the structure shown in FIGS. 22A and 22B). Thus, very high damping can be provided for the tensioner in applications where very severe torsional vibrations are expected.

Figure 23A:
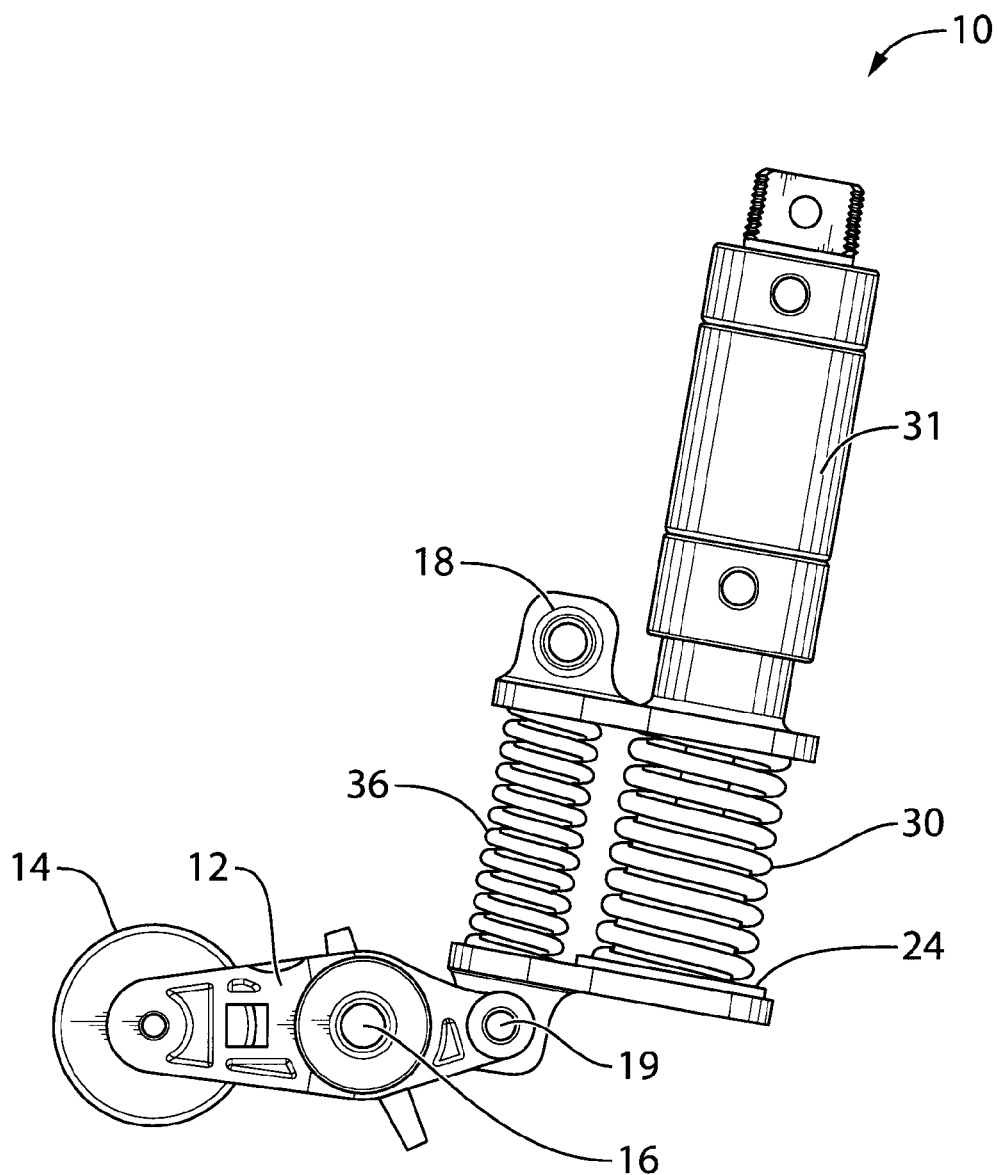
FIGS. 23A-23C are elevation views of another embodiment of a tensioner in which show two springs acting in parallel on the tensioner arm.
Figure 23B:
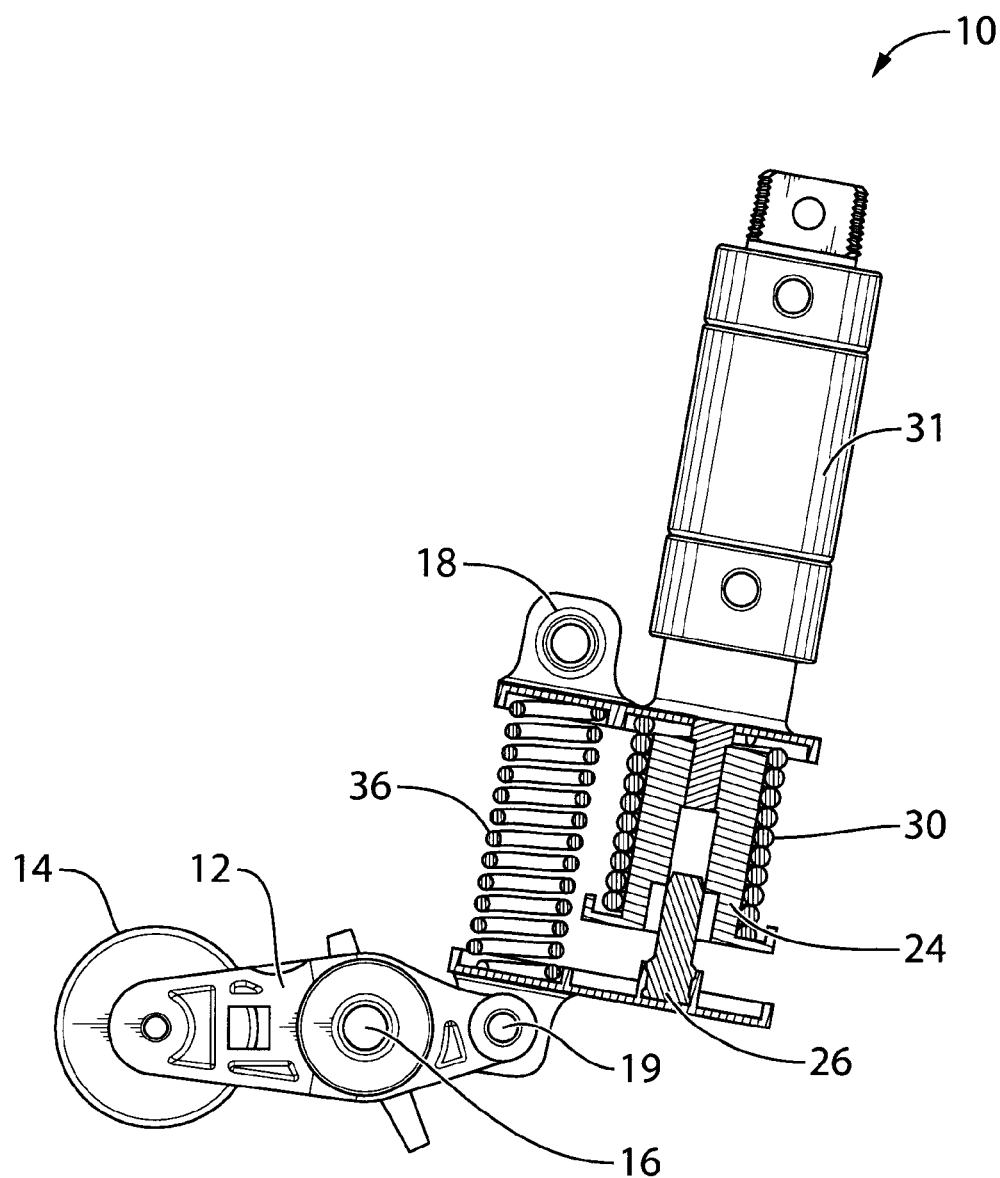
Figure 23C:
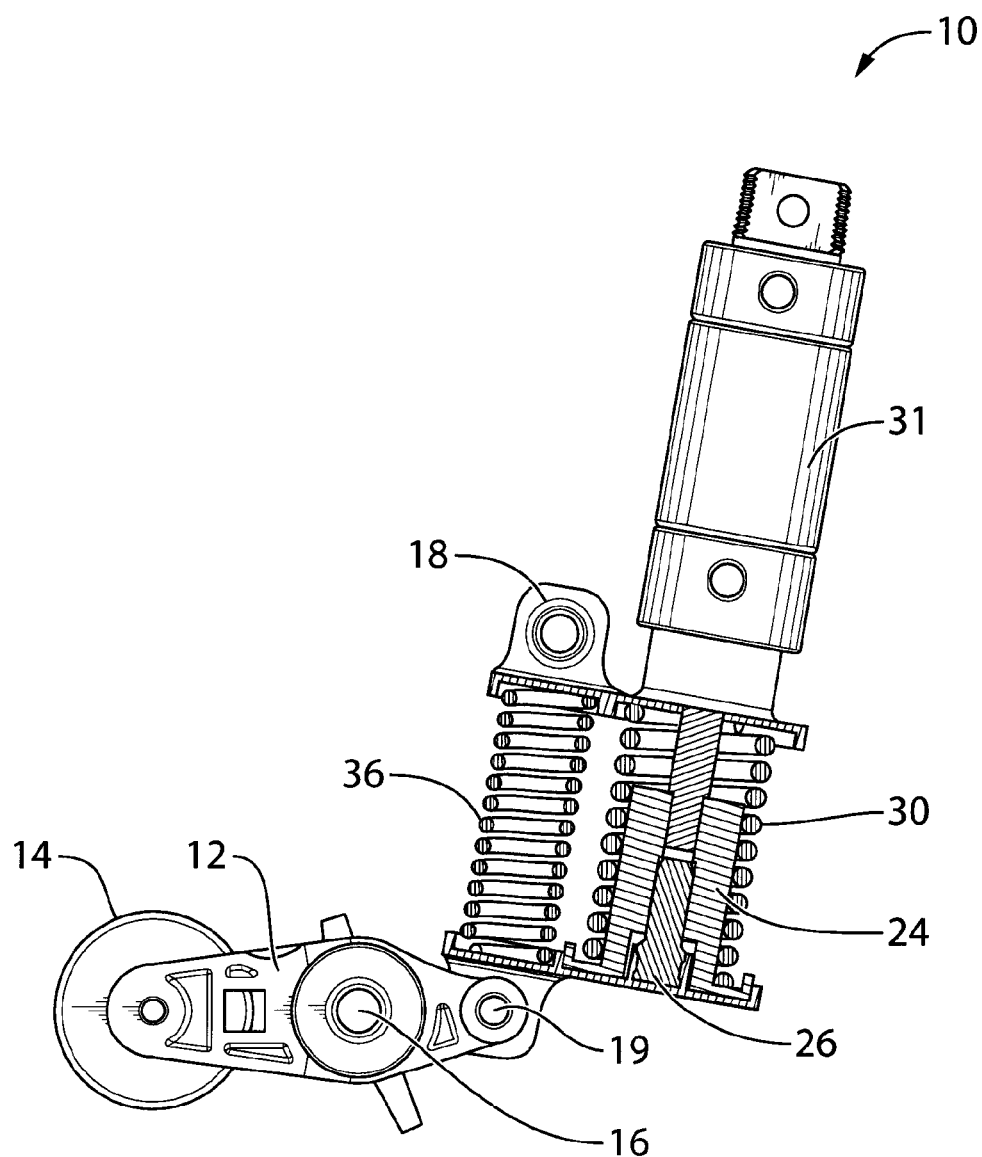

FIGS. 23A-23C show an alternative construction for the tensioner 10. In the embodiment shown therein, the first and second springs 30 and 36 are in parallel instead of being in series as they are in FIGS. 3A and 3B. Upon retraction of the first moveable body 24 by the actuator 31, as shown in FIG. 23B, only the second spring 36 acts on the tensioner arm 12, thereby placing the tensioner 10 in a low tension mode. By permitting extension of the first moveable body 24 so that both the first and second springs 30 and 36 act on the tensioner arm 12, as shown in FIG. 23C the tensioner 10 is placed in a high tension mode. It will be noted that, in this embodiment, because the springs 30 and 36 are in parallel, the spring rate in the high tension mode is the sum of the two individual spring rates for the springs 30 and 36, while the spring rate in the low tension mode is the spring rate of the second spring only. It will be noted that in such an embodiment, the first spring 30 need not have a higher spring rate than the second spring 36. The spring rate of the first spring 30 could be the same as or even lower than the spring rate of the second spring 36.

Figure 24A:
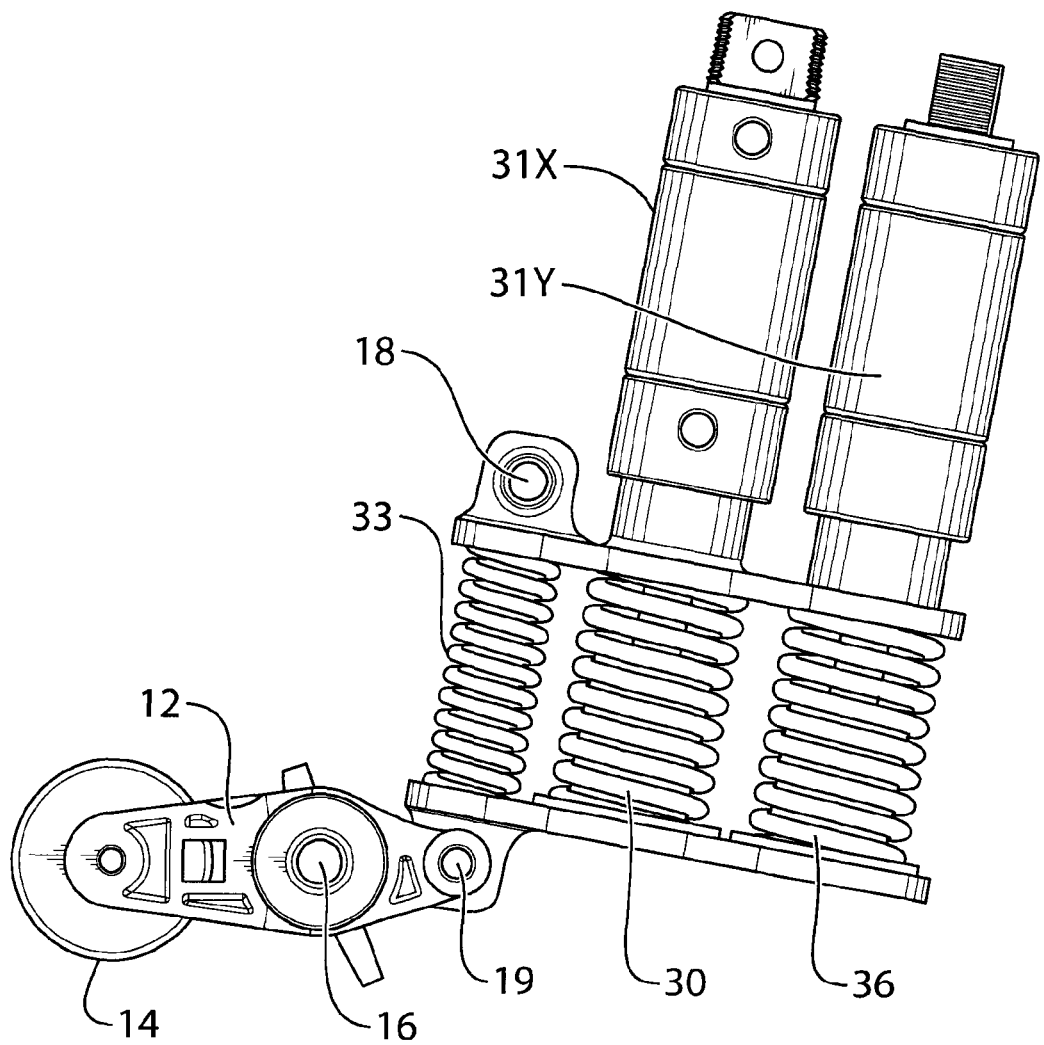
FIGS. 24A-24D are elevation views of another embodiment of a tensioner in which show three springs acting in parallel on the tensioner arm.
Figure 24B:
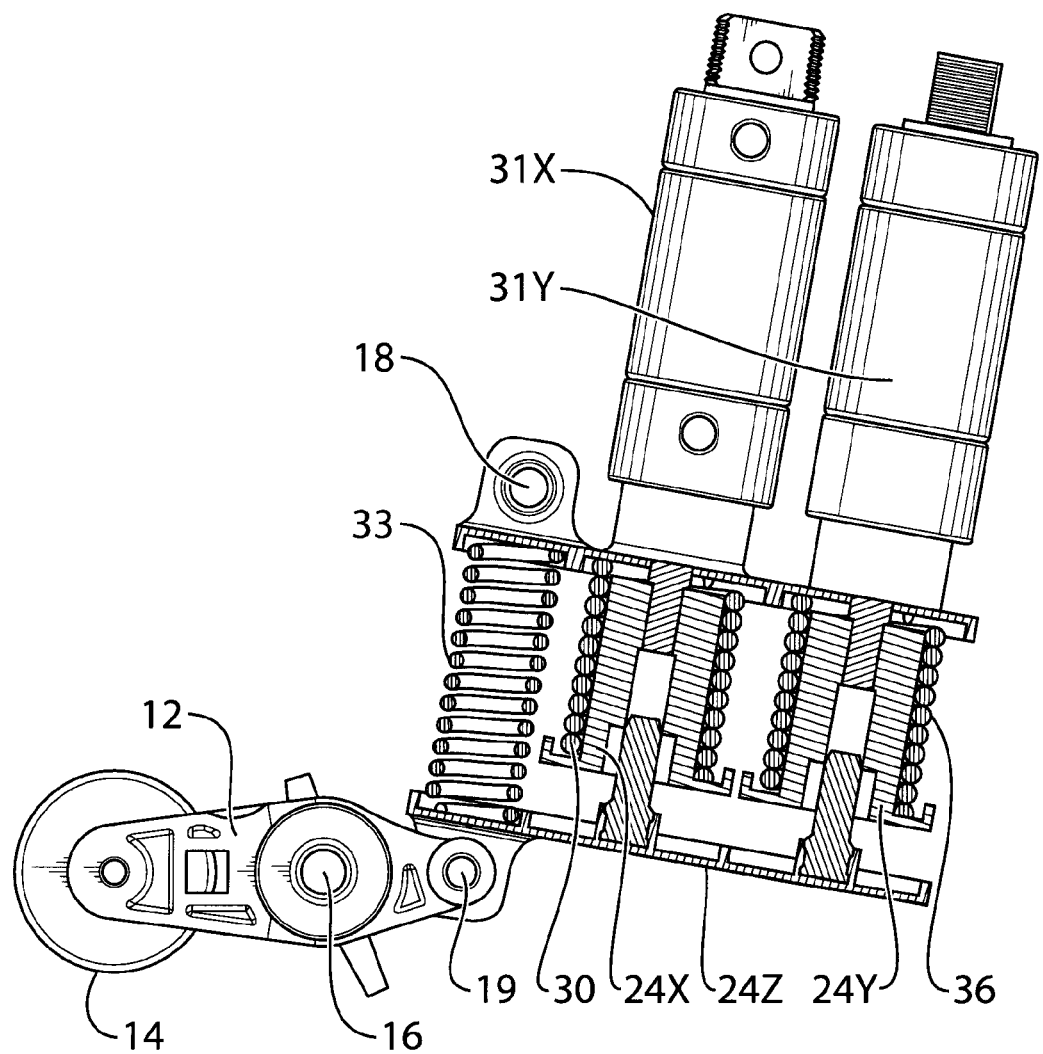
Figure 24C:
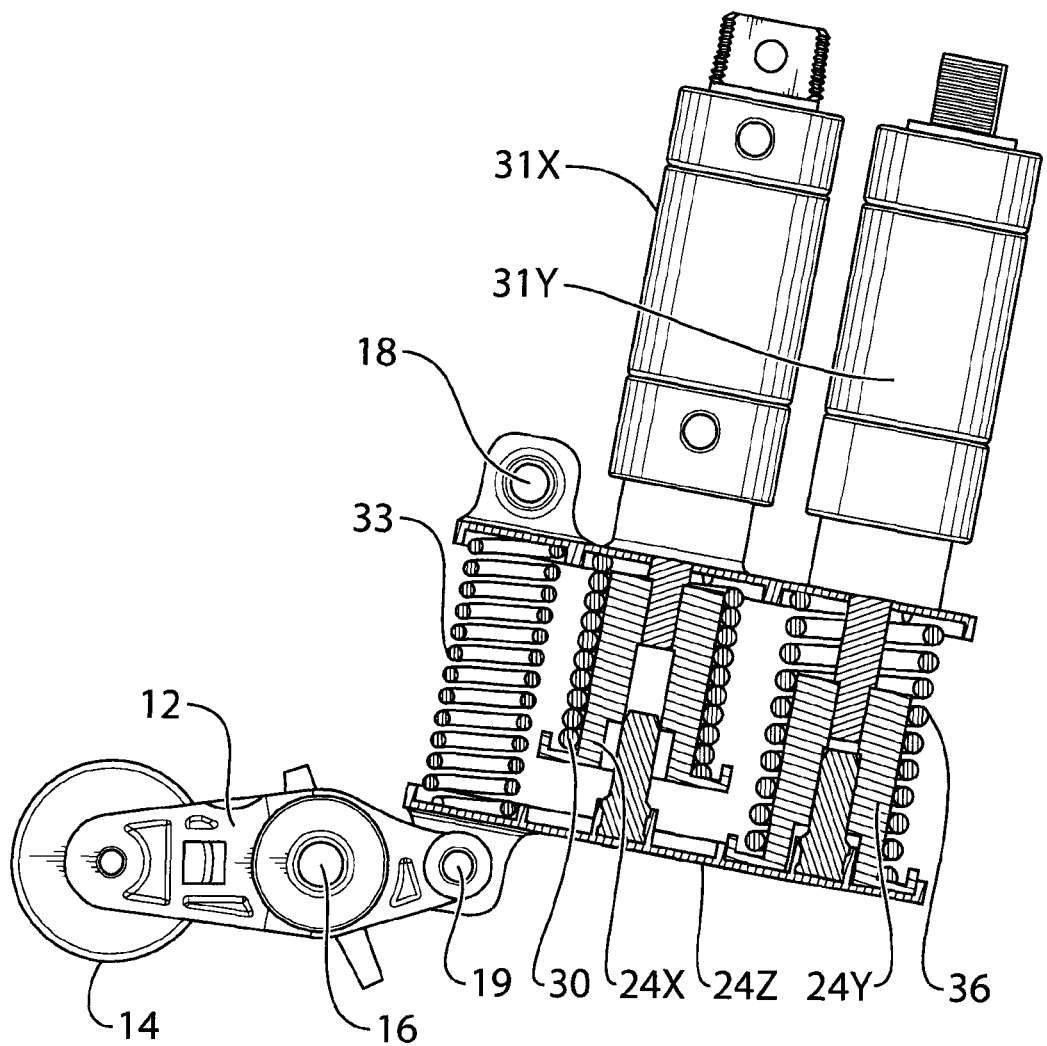
Figure 24D:
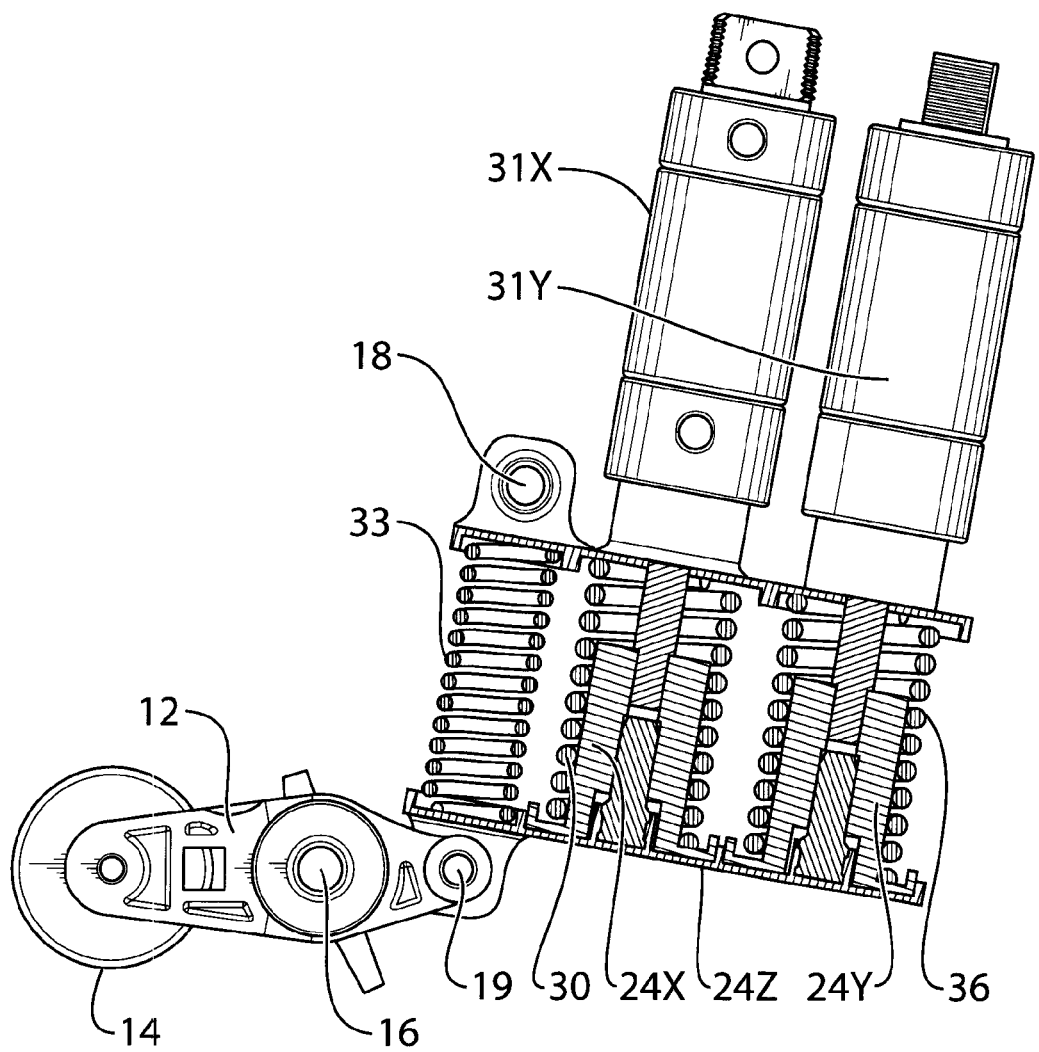

FIGS. 24A-24D show a construction in which the tensioner 10 has three springs (i.e. a first spring 30, a second spring 36 and a third spring 33) are arranged in parallel. The tensioner 10 in FIGS. 24A-24D may operate as follows. Retraction of a first moveable body 24X by a first actuator 31X (i.e. placing the first actuator 31X in its first state) and retraction of a second moveable body 24Y by a second actuator 31Y (i.e. placing the second actuator 31Y in its first state) collapses first and second springs 30 and 36, leaving only a third spring 33 in engagement with the tensioner arm 12, as shown in FIG. 24B. This corresponds to a low tension mode for the tensioner. By permitting extension of the second actuator 31Y (i.e. placing the second actuator 31Y in the second state by cutting power to it while leaving the first actuator 31X in the first state), the second spring 36 extends engages the tensioner arm 12 so that the second and third springs act in parallel on the tensioner arm 12, as shown in FIG. 24C. Thus the spring rate on the tensioner arm 12 is the sum of the spring rates of the second and third springs 36 and 33. This corresponds to a medium tension mode. By permitting extension of both the first and second actuators 31X and 31Y (i.e. placing the first and second actuators in their respective second states by cutting power to both of them) as shown in FIG. 24D, all three springs are engaged in parallel with the tensioner arm 12. Thus the spring rate of the tensioner is the sum of the spring rates for the three springs 30, 36 and 33. This corresponds to a high tension mode for the tensioner. As above, in relation to the two springs in FIGS. 23A-23C, there is no need for a particular order in the spring rates of the three springs 30, 36 and 33 because their spring rates are additive as each spring comes into engagement with the arm 12. Thus the first spring 30 need not have a higher spring rate than the second spring and the second spring need not have a higher spring rate than the third spring. The spring rate for the three springs could be the same. Alternatively, any other combination of spring rates may be used. In the embodiment shown, the spring rates for the first and second springs 30 and 36 may be the same and the spring rate for the third spring 33 may be lower than that of the first and second springs 30 and 36.

Figure 25A:
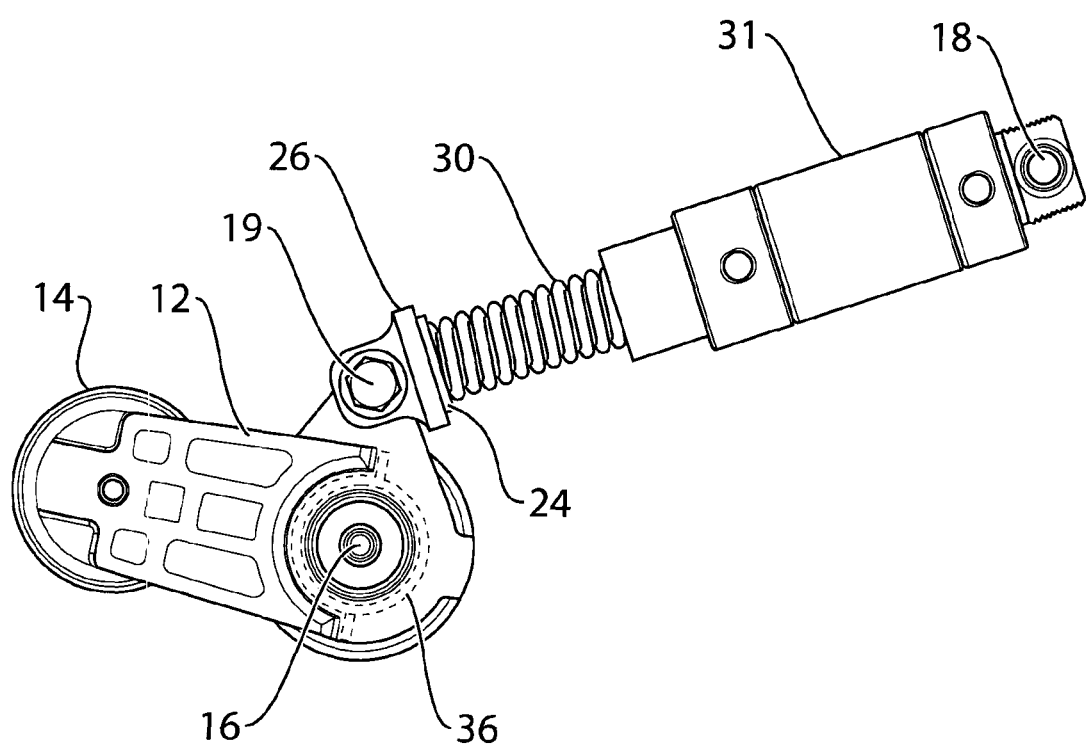
FIGS. 25A-25C are elevation views of another embodiment of a tensioner in which one of the springs is a torsion spring.
Figure 25B:
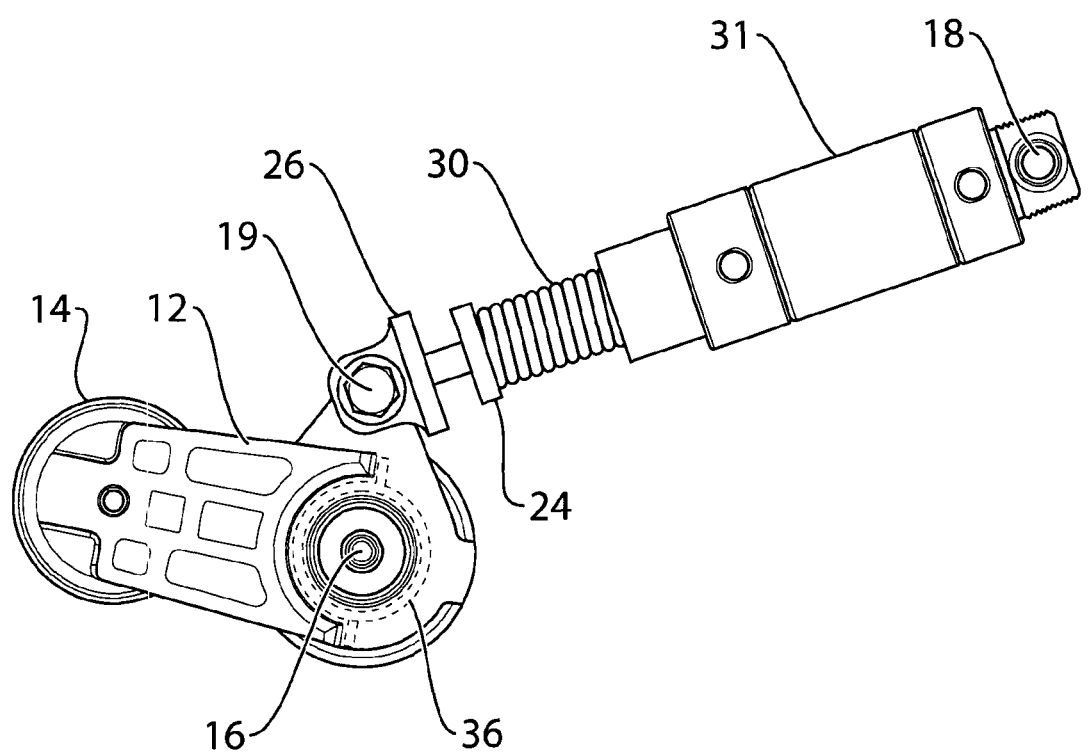
Figure 25C:
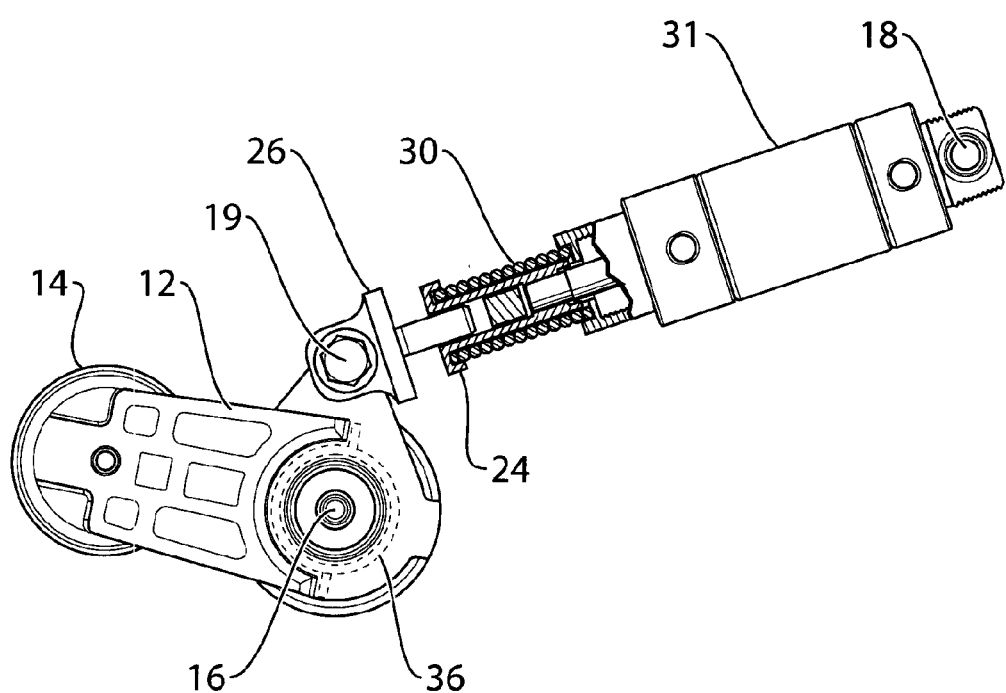

Reference is made to FIGS. 25A-25C, which show another construction for the tensioner 10. In this embodiment, the tensioner 10 has a first spring 30 which is a helical compression spring and a second spring 36 which is a torsion spring. In a low tension mode (FIG. 25B), the actuator 31 retracts a first movable member 24 so that the first spring 30 is not engaged with the arm 12. Thus only the torsion spring 36 engages the arm 12. In a high tension mode (FIG. 25C), the actuator 31 permits extension of the first spring 30, the first spring 30 engages the tensioner arm 12 through the second movable body 26. In this embodiment, the two springs 30 and 36 act in parallel, as occurs in the embodiment shown in FIGS. 23A-23C, and so the spring rates of the two springs 30 and 36 are additive, and so there is no need for one spring to have a higher spring rate than the other. In a variant of this embodiment, the first movable body 24 could directly abut a drive surface on the arm 12 itself instead of abutting a second movable body. Put another way, the second movable body 26 could be, for example, a projection that is integral with the tensioner arm 12. In such a variant, retraction of the first movable body 24 by retraction of the actuator 31 would simply pull the first movable body off of the tensioner arm 12 so that the spring 30 does not exert a force on the arm 12. Permitting extension of the actuator 31 permits the spring 30 to extend into operative engagement with the arm 12.

Figure 26A:
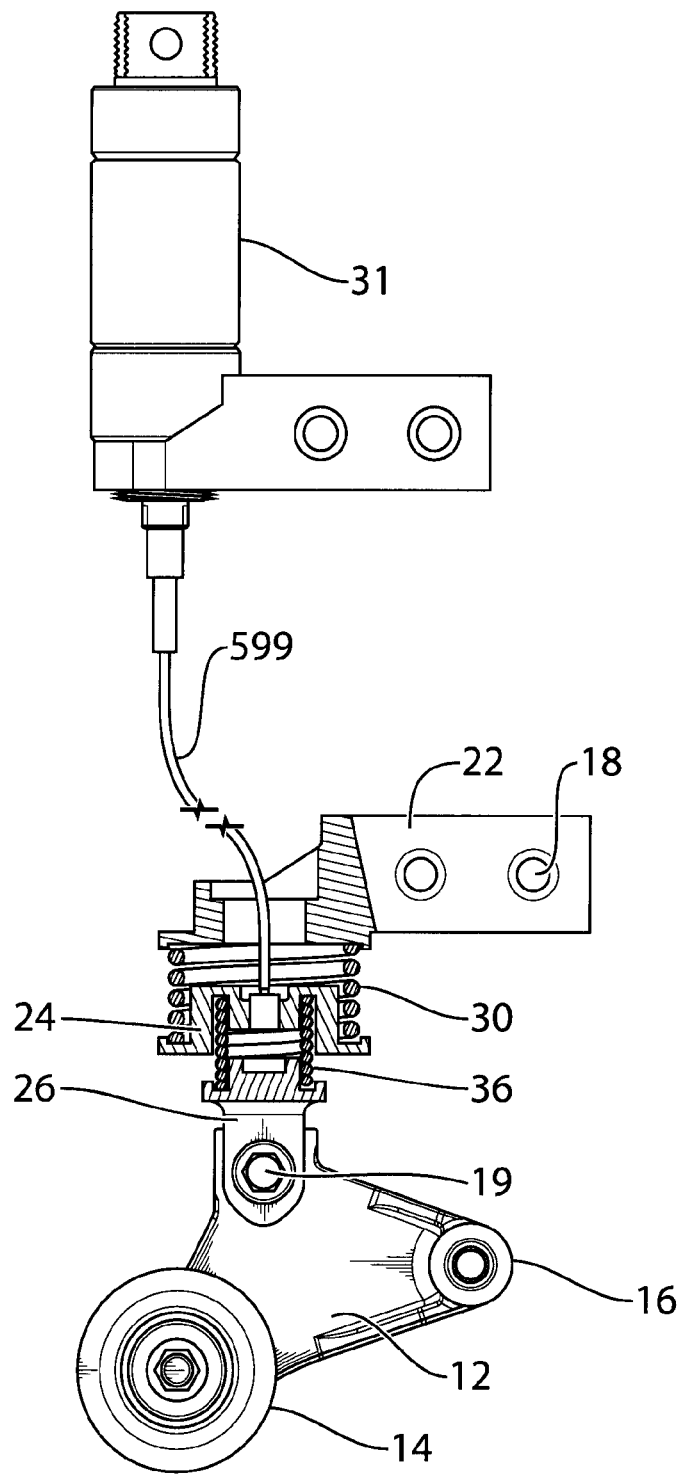
FIGS. 26A and 26B are elevation views of another embodiment of a tensioner in which the actuator is positioned remotely from other components of the tensioner.
Figure 26B:
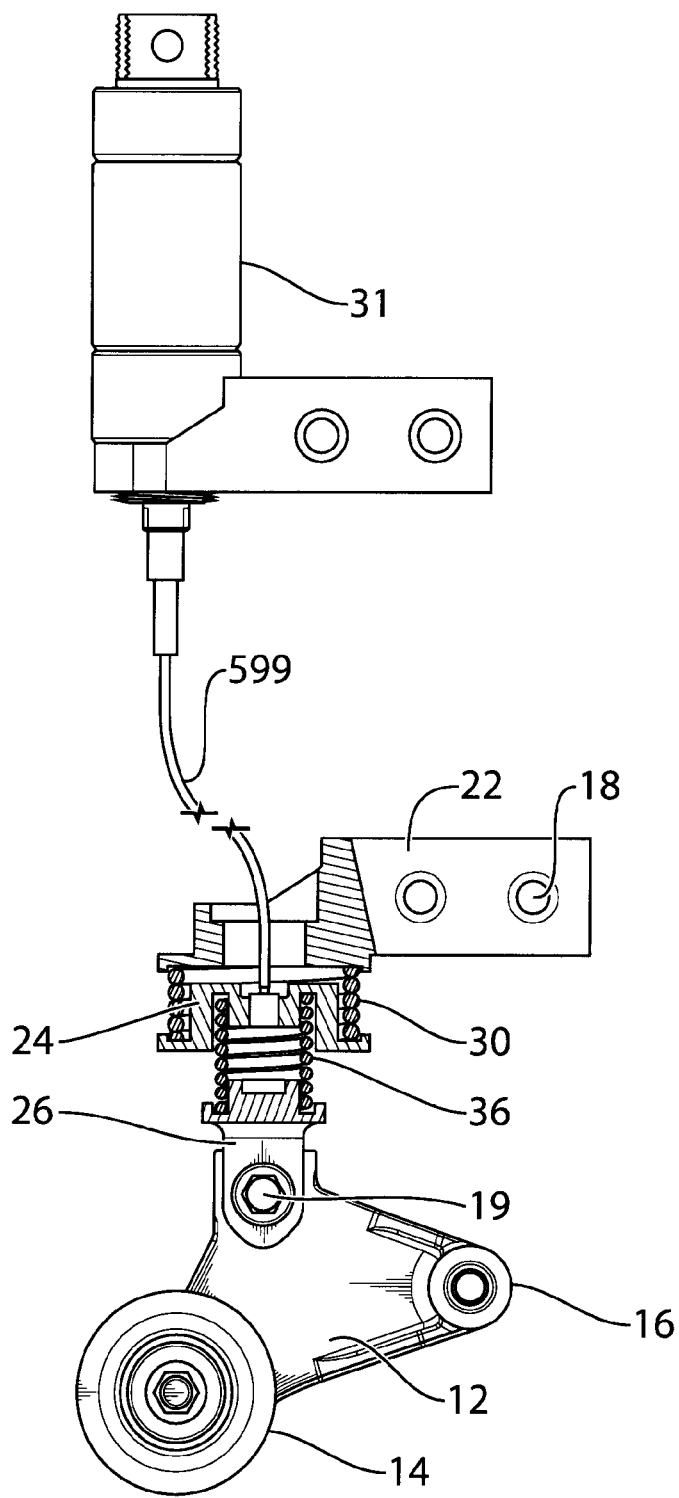

Reference is made to FIGS. 26A and 26B, which show another construction for the tensioner 10 in which the actuator 31 is remote from the first and second springs 30 and 36 and from the first and second movable bodies 24 and 26. In this embodiment the actuator 31 is operative connected to the first movable body 24 via a cable 599. By retracting the actuator 31, the cable 599 is retracted and so the first movable body 24 retracts collapsing the first spring 30, so that only the second spring acts on the tensioner arm 12 (FIG. 26B). By permitting extension of the actuator 31, the first spring 30 drives the first movable body 24 to extend thereby at least partially (and preferably fully) collapsing the second spring 36 so that the first spring 30 acts on the tensioner arm 24 (FIG. 26A). Using a cable 599 to transfer power from the actuator 31 to the movable body 24 permits the actuator 31 to be positioned remotely from the rest of the tensioner. This facilitates packaging the tensioner in a tight space in the engine compartment of the vehicle. Furthermore, this permits the actuator 31 to be spaced in a cooler section of the engine compartment in embodiments where that is advantageous.

In this embodiment, the springs 30 and 36 are positioned in series and so there is a preferred relationship between their respective spring rates, in that the first spring 30 has a higher spring rate than the second spring 36.

In the embodiments shown, the actuators are not actively driven to their extended position (corresponding to their second states) by a motive force such as pneumatic pressure—they are extended upon cutting power to the actuators, by the built-up force in the springs that were compressed when the actuators were retracted. In other words, the extension of the first movable body 24 may occur simply by cutting power (e.g. pneumatic or electric power) to the actuator 31—it may not be necessary to actively drive the actuator 31 to the extended position. It will further be noted that the actuators need not be retracted to be in their first states and be extended to be in their second states. The actuators could be rearranged so that they retract to be in their second states and extend to be in their first states.

As noted above, while a pressurized (i.e. positive pressure) pneumatic actuator has been shown, in other embodiments the actuator may be a negative pressure (vacuum) actuator, a hydraulic actuator, an electric motor (and optional gear arrangement), a linear or rotary solenoid, a wax actuator, a shape memory allow actuator, a bi-metallic actuator, or any other suitable actuator. Furthermore, in some embodiments, a plurality of actuators may be used to control the use of a plurality of springs. In such cases it will be noted that all the actuators need not be identical. For example, an electric motor may be used for one actuator while a solenoid may be used for another. The selection of which type of actuator may be made based on what type of power is readily available in the vehicle. For example, if the vehicle is equipped with a compressed air system, then a positive pressure pneumatic actuator may be used for the tensioner; if the vehicle is equipped with a negative pressure (vacuum) system, then a negative pressure actuator may be used for the actuator, and so on.

While the tensioner may be applicable in particular to vehicles with large diesel and gasoline engines, where significant amounts of tension are typically present in the belt and significant amount of parasitic losses can be avoided, the tensioner may also be applicable in smaller vehicle applications such as passenger cars and light trucks. In embodiments where the vehicle is a passenger car or light truck the actuator (or actuators) may be hydraulic and may use hydraulic pressure from the vehicle's power steering system. Alternatively in some vehicles, the actuator or actuators could be vacuum operated and could draw power from the vehicle's vacuum braking assist system. In embodiments wherein gas pressure (positive or negative) is used for the actuator, a small accumulator tank may be provided within the gas circuit so as to retain pressure or vacuum as the case may be, when the vehicle is not running thereby permitting instantaneous operation upon engine start-up.

While the term 'spring rate' has been used in most places in this disclosure, it has been used for convenience in light of having described and shown types of springs in most of the embodiments. It will be understood, however, that any suitable elastic body may be used in place of the items that are explicitly referred to as springs. Accordingly, the more general term 'stiffness coefficient' may be used to describe the elasticity of such bodies, rather than the term 'spring rate'. In addition, the term 'elasticity rate' can be used as a term that is generally equivalent to 'stiffness coefficient'.

The tensioner arm has been described in each of the embodiments above as being pivotally mounted to a stationary structure, however, it is alternatively possible to provide an embodiment in which the tensioner arm is moveably mounted to a stationary structure in some other way, such as by means of a linear sliding connection so that the tensioner can slide linearly relative to the stationary structure to bring the pulley towards and away from the belt, instead of undergoing a pivoting movement to bring the pulley towards and away from the belt.

In embodiments wherein the strut includes two or more springs are arranged in parallel with one another, any of those springs could itself be a compound spring.

It is optionally possible to provide an embodiment in which two series spring arrangements similar to that shown in FIGS. 3A and 3B or even FIGS. 13A and 13B are themselves arranged in parallel. Thus a first strut with first and second springs arranged in series and controllable via a first actuator, can be arranged in parallel with a second strut that also includes first and second springs arranged in series and controllable via a second actuator.

The strut 20 has been described as being connected pivotally to the arm 12 at pivot connection 19 in embodiments where the arm 12 is movable pivotally relative to the stationary structure (e.g. the block of the engine 13). However in embodiments where the arm 12 is movable linearly relative to the block it will be understood that there need not be a pivotal connection between the second (or third, or nth) moveable body and the arm 12. The connection could alternatively be a solid connection.

Those skilled in the art will understand that a variety of modifications may be effected to the embodiments described herein without departing from the scope of the appended claims.

What is claimed:

1. A tensioner for maintaining tension in an endless drive member, comprising:
    an arm movably mountable to a stationary structure;
    a pulley rotatably mounted to the arm and which is engageable with the endless drive member; and
    a strut connected to the arm, the strut including:
        a base that is mountable to the stationary structure;
        a first body moveable relative to the base;
    a first resilient element connected between the base and the first body, the first resilient element having a first stiffness coefficient;
    a second body moveable relative to the first body, the second body being connected to the arm;
    a second resilient element connected between the first body and the second body, the second resilient element having a second stiffness coefficient that is different than the first stiffness coefficient; and
    an actuator, positionable in a first state in which the actuator fixes the position of the first body relative to the base, and a second state in which the actuator permits movement of the first body relative to the base by the first resilient element,
        wherein the second resilient element has a second stiffness coefficient that is lower than the first stiffness coefficient.

2. A tensioner as claimed in claim 1, wherein in the first state the actuator deforms the first resilient element to a condition in which the first resilient element is solid.

3. A tensioner as claimed in claim 1, wherein when the actuator is in the first state the strut has a stiffness coefficient that is the second stiffness coefficient.

4. A tensioner as claimed in claim 3, wherein when the actuator is in the second state the stiffness coefficient of the strut is the first stiffness coefficient.

5. A tensioner as claimed in claim 4, wherein the first stiffness coefficient is sufficiently higher than the second stiffness coefficient that when the actuator is in the second state, the first resilient member deforms the second resilient member to a condition in which the second resilient member is solid.

6. A tensioner as claimed in claim 1, wherein the tensioner is mounted to an engine by one of: (a) pivotally mounting the arm to the engine, pivotally mounting the base to the engine and pivotally mounting the second body to the arm; and (b) pivotally mounting the arm to the engine, pivotally mounting the second body to the engine and pivotally mounting the base to the arm.

7. A tensioner as claimed in claim 1, wherein at least one of the first and second resilient members is a compound spring that includes a first spring member and a second spring member that act independently on the first body.

8. A tensioner as claimed in claim 1, wherein at least one of the first and second resilient members is a compound spring that includes a first spring member and a second spring member that act in series on the first body.

9. A tensioner as claimed in claim 1, further comprising a bumper positioned to engage the first body in the event that the endless drive member applies a force on the pulley that overcomes the first resilient member.

10. A tensioner as claimed in claim 1, further comprising a damping member that is positioned to engage a friction surface during movement of the arm to dampen movement of the arm.

11. A tensioner as claimed in claim 1, wherein the actuator is a compound actuator that includes a first actuation structure and a second actuation structure.

12. A tensioner as claimed in claim 1, wherein the actuator is operatively connectable to the first body via a cable.

13. A tensioner as claimed in claim 1, wherein the arm has an arm pivot connector for pivotally mounting the arm to the stationary structure, and the second body is pivotally connected to the arm, and wherein the base has a pivot mount configured for pivotally mounting the base to the stationary structure.

14. A tensioner as claimed in claim 1, wherein the actuator is a first actuator, and wherein the tensioner further comprises:
   a third body moveable relative to the second body, the third body being connectable to the arm, and wherein the second body is connectable to the arm through the third body;
   a third resilient element connected between the second body and the third body, the third resilient element having a third stiffness coefficient that is lower than the second stiffness coefficient; and
   a second actuator, positionable in a first state in which the second actuator fixes the position of the second body relative to the first body, and a second state in which the second actuator permits movement of the second body relative to the first body by the second resilient member.

* * * * *